(12) United States Patent
Hetrick et al.

(10) Patent No.: US 8,418,966 B2
(45) Date of Patent: Apr. 16, 2013

(54) COMPLIANT STRUCTURE DESIGN OF VARYING SURFACE CONTOURS

(75) Inventors: Joel A. Hetrick, Ann Arbor, MI (US); Sridhar Kota, Ann Arbor, MI (US); Gregory F. Ervin, Novi, MI (US)

(73) Assignee: FlexSys, Inc., Ann Arbor, MI (US)

( * ) Notice: Subject to any disclaimer, the term of this patent is extended or adjusted under 35 U.S.C. 154(b) by 501 days.

(21) Appl. No.: 12/226,790

(22) PCT Filed: Apr. 27, 2007

(86) PCT No.: PCT/US2007/010438
§ 371 (c)(1),
(2), (4) Date: May 5, 2009

(87) PCT Pub. No.: WO2007/145718
PCT Pub. Date: Dec. 21, 2007

(65) Prior Publication Data
US 2009/0302168 A1    Dec. 10, 2009

Related U.S. Application Data

(60) Provisional application No. 60/795,956, filed on Apr. 27, 2006.

(51) Int. Cl.
*B64C 3/50* (2006.01)

(52) U.S. Cl.
USPC .................................. 244/214; 244/213

(58) Field of Classification Search ............... 244/99.2, 244/99.3, 210–217
See application file for complete search history.

(56) References Cited

U.S. PATENT DOCUMENTS

| | | | | |
|---|---|---|---|---|
| 2,776,577 A | * | 1/1957 | Olchawa | 74/424.75 |
| 3,994,452 A | * | 11/1976 | Cole | 244/214 |
| 2003/0102411 A1 | * | 6/2003 | Kota | 244/219 |

FOREIGN PATENT DOCUMENTS

WO   WO 2004108525 A1 * 12/2004

\* cited by examiner

*Primary Examiner* — Tien Dinh
*Assistant Examiner* — Nicholas McFall
(74) *Attorney, Agent, or Firm* — Rohm & Monsanto, PLC

(57) ABSTRACT

An edge morphing arrangement for an airfoil having upper and lower control surfaces is provided with a rib element arranged to overlie the edge of the airfoil. The rib element has first and second rib portions arranged to communicate with respectively associated ones of the upper and lower control surfaces of the airfoil. A first compliant linkage element has first and second ends and is disposed between the first and second rib portions of the rib element, the first and second ends are each coupled to the interior of a respectively associated one of the first and second rib portions. There is additionally provided a driving link having first and second driving link ends, the first driving link end being coupled to the interior of a selectable one of the first and second rib portions.

15 Claims, 24 Drawing Sheets

DESIGN OPTIMIZATION PROCEDURE

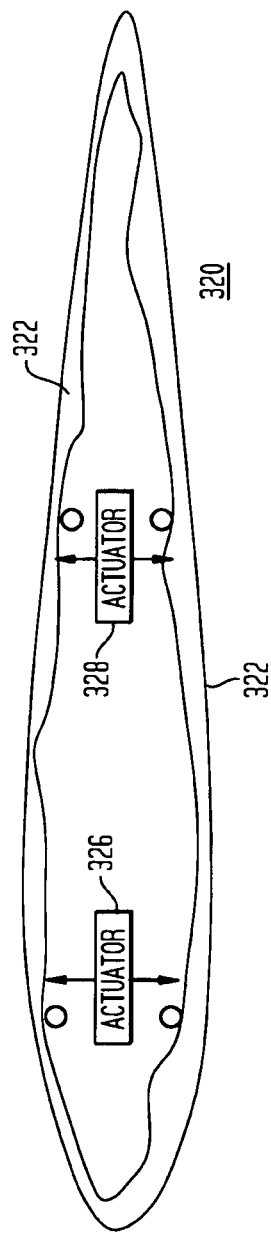
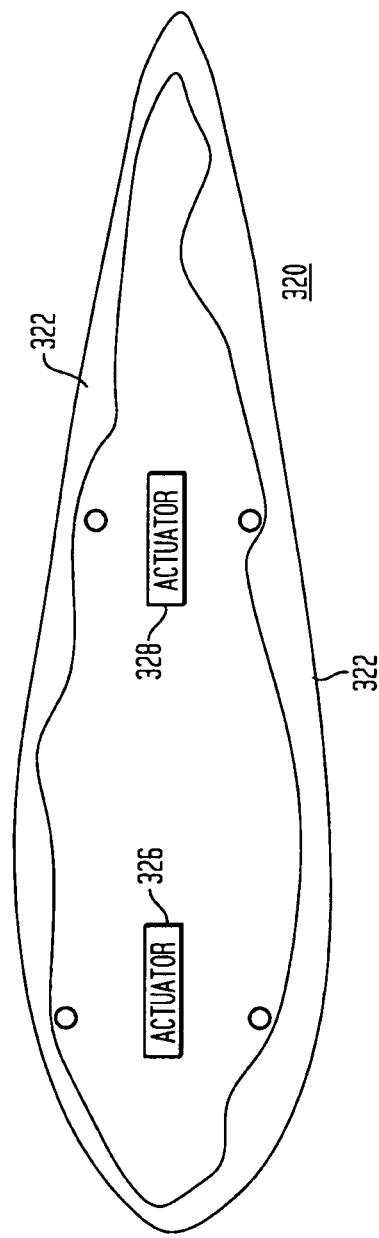

COMPLIANT STRUCTURE DESIGN OF VARYING SURFACE CONTOURS

CROSS-REFERENCE TO RELATED APPLICATIONS

This application is a US national stage filing under 35 U.S.C. §371 of International Application No. PCT/US2007/010438 filed on Apr. 27, 2007 and claims the benefit under 35 U.S.C. §119(e) of United States Provisional Patent Application Ser. No. 60/795,956, filed Apr. 27, 2006. The disclosures in these applications are incorporated herein by reference.

BACKGROUND OF THE INVENTION

1. Field of the Invention

This invention relates generally to resilient systems, and more particularly, to a resilient air foil arrangement that has a variable aerodynamic configuration.

2. Description of the Design Challenges

Designing an adaptive control surface for a rotorcraft poses significant challenges. The primary challenge is to design an efficient structure that can distribute local actuation power to the surface of the airfoil to produce a specified shape change. This system must provide the appropriate shape control over the adaptive surface while meeting power, weight, packaging, and survivability constraints. Due to the challenge of rotorcraft systems, one must address the following design criteria:

Shape Morphing
D-Spar location
Required shapes for stall elimination
Wear strip location (top-bottom % chord)
Compliant structure topology/geometry to effect shape change
Power Required to Achieve Deflection:
Pressure loading
Required deflection (10°, 5°)
Response time (5 Hz to 7 Hz)
Required compliant structure stiffness (aeroelastic and dynamic constraints)
Packaging Issues:
Available actuator power density (ultrasonic rotary, electromagnetic, inchworm, etc.)
D-Spar location
Actuator system geometry—must move with flap (maximize available space)
Functionality:
Structural integrity of LE flap
Dynamic/Aeroelastic response & fatigue loading The process of designing a compliant structure leading edge flap is a highly inter-disciplinary process that involves aerodynamics, structural mechanics, and kinematics. These components are all interrelated such that the final compliant structure design depends heavily on all three (FIG. 1). Essentially, aerodynamic analysis drives the ideal aerodynamic shapes and predicts the pressure distributions experienced by these shapes. Kinematics relates to shapes that are achievable given design limitations such as restricting elongation of the surface perimeter and minimizing curvature transitions that relate to structural stress. Note that the structure may be optimized around an intermediate target shape (called the medial strain position) that reduces forces and stresses over the entire shape change envelope. This places added importance on the target shape design as the medial strain shape must be able to accurately morph into the extreme target shapes.

SUMMARY OF THE INVENTION

The foregoing and other objects are achieved by this invention, which provides an edge morphing arrangement for an airfoil having upper and lower control surfaces. In accordance with the invention, the airfoil edge morphing arrangement is provided with a rib element arranged to overlie the edge of the airfoil. The rib element has first and second rib portions arranged to communicate with respectively associated ones of the upper and lower control surfaces of the airfoil. A first compliant linkage element has first and second ends and is disposed between the first and second rib portions of the rib element, the first and second ends are each coupled to the interior of a respectively associated one of the first and second rib portions. There is additionally provided a driving link having first and second driving link ends, the first driving link end being coupled to the interior of a selectable one of the first and second rib portions in the vicinity of the coupling of the respectively associated end of the first compliant linkage element. The second end is arranged to receive a morphing force, and the rib element is deformed in response to the morphing force.

In one embodiment of this apparatus aspect of the invention, there is further provided a second compliant linkage element having first and second ends and disposed between the first and second rib portions of the rib element. The first and second ends are each coupled to the interior of a respectively associated one of the first and second rib portions. The first and second compliant linkage elements are arranged to have a predetermined angular relationship.

In an advantageous embodiment, a linear actuator is provided having a longitudinal axis and a first coupler element angularly arranged in relation to the longitudinal axis. A rotatory element having an axis of rotation and a second coupler element is engaged with the second end of the driving link. The first coupler element of the linear actuator is provided with a slot arranged in relation to the longitudinal axis. Additionally, the second coupler element of the rotatory element is provided with an engagement pin for engaging with the slot of the first coupler element. A bearing arrangement couples the engagement pin rotatively to the rotatory element.

Preferably, the first rib portion is fixedly coupled to the upper control surface, and the second rib portion is slidably coupled to the lower control surface. In this specific illustrative embodiment of the invention, a rotatory drive element is coupled to the second end of the driving link for delivering the morphing force. A longitudinal drive element engages with the rotatory drive element for urging the rotatory drive element to deliver the morphing force.

In a still further embodiment, there is provided a further rib element, the second rib element is arranged to overlie the edge of the airfoil, the further rib element having respective first and second rib portions arranged to communicate with respectively associated ones of the upper and lower control surfaces of the airfoil. A further first compliant linkage element has first and second ends and disposed between the first and second rib portions of the further rib element, the first and second ends are each coupled to the interior of a respectively associated one of the first and second rib portions. Additionally, a further driving link having first and second driving link ends is also provided, the first driving link end being coupled to the interior of a selectable one of the first and second rib portions of the further rib element in the vicinity of the coupling of the respectively associated end of the first compliant linkage element, and the second end being arranged to receive a respective morphing force. The further rib element is deformed in response to the respective morphing force. A rotatory drive element is coupled to the second end of the driving link of the rib element and the second end of the further driving link of the further rib element, for delivering a respective morphing force to each of the driving link and the further driving link. A longitudinal drive element engages with the rotatory drive element for urging the rotatory drive element to deliver the respective morphing forces. Additionally, an edge cover is arranged to overlie the rib element and the further rib element on the edge of the airfoil, the edge cover having first and second cover portions arranged to communicate with respectively associated ones of the upper and lower control surfaces of the airfoil.

In accordance with a highly advantageous embodiment of the invention, the driving link and the further driving link are configured to produce respectively different deformations of the respective rib element and further rib element. More specifically, for a given extent of actuation, the rib element and the further rib element are configured to have different operating ratios. This is useful in designing airfoil loadings, for example, that vary over the span of the airfoil or rotor blade.

The cover, or skin, has a thickness that is varied to accommodate internal structures and also to achieve a predetermined compliance characteristic.

In accordance with a second apparatus aspect of the invention, there is provided an edge morphing arrangement for an airfoil having upper and lower control surfaces, the airfoil edge morphing arrangement being provided with a plurality of rib elements each arranged to overlie the edge of the airfoil. Each of the rib elements has first and second rib portions arranged to communicate with respectively associated ones of the upper and lower control surfaces of the airfoil. In addition, each of the rib elements has an associated one of:

a first compliant linkage element having first and second ends and disposed between the first and second rib portions of the associated rib element, the first and second ends are each coupled to the interior of a respectively associated one of the first and second rib portions; and a driving link having first and second driving link ends, the first driving link end are coupled to the interior of a selectable one of the first and second rib portions in the vicinity of the coupling of the respectively associated end of the first compliant linkage element, and the second end is arranged to receive a morphing force, the rib element being deformed in response to the morphing force.

Additionally, a rotatory drive element is coupled to each of the second ends of each of the driving links for delivering a respective morphing force to each of the driving links. Each of the plurality of rib elements is deformed in response to the respectively applied morphing force.

In one embodiment of this further aspect of the invention, there is additionally provided a longitudinal drive element that is engaged with the rotatory drive elements for urging the rotatory drive element to deliver the respective morphing forces.

In a still further embodiment, there is provided an edge cover arranged to overlie the plurality of rib elements on the edge of the airfoil, the edge cover having first and second cover portions arranged to communicate with respectively associated ones of the upper and lower control surfaces of the airfoil. Each of the plurality of rib elements is has a second compliant linkage element with first and second ends, and is disposed between the first and second rib portions of the associated rib element. The first and second ends are each coupled to the interior of a respectively associated one of the first and second rib portions. The first and second compliant linkage elements of each of the plurality of rib elements are arranged to have a predetermined angular relationship.

In yet another embodiment of this second apparatus aspect of the invention, the rotatory drive element is pivotally coupled to the airfoil. Morphing forces are applied in response to pivotal rotation of the rotatory drive element.

In accordance with a third apparatus aspect of the invention, there is provided an arrangement for converting linear motion to rotatory motion, the arrangement having a linear actuator having a longitudinal axis and a first coupler element angularly arranged in relation to the longitudinal axis. Additionally, a rotatory element having an axis of rotation and a second coupler element engages with the first coupler element.

The linear actuator is, in some embodiments of the invention, be a push rod, a reciprocating cam, or a linear motor.

In accordance with one embodiment of this third aspect of the invention, there is additionally provided a drive linkage coupled to the rotatory element for producing a driving force.

There are additionally provided a rib element having first and second rib portions; a first compliant linkage element having first and second ends and disposed between the first and second rib portions of the rib element, the first and second ends are each coupled to the interior of a respectively associated one of the first and second rib portions; and a driving link having first and second driving link ends, the first driving link end is coupled to the interior of a selectable one of the first and second rib portions in the vicinity of the coupling of the respectively associated end of the first compliant linkage element, and the second end is arranged to receive the driving force, the rib element being deformed in response to the driving force.

A second compliant linkage element has first and second ends and disposed between the first and second rib portions of the rib element. The first and second ends are each coupled to the interior of a respectively associated one of the first and second rib portions.

In an advantageous embodiment of this aspect of the invention, there provided an airfoil having first and second control surfaces and an edge. A plurality of rib elements are each arranged to overlie the edge of the airfoil, each of the rib elements having first and second rib portions arranged to communicate with respectively associated ones of the upper and lower control surfaces of the airfoil. Each of the rib elements has an associated one of:

a first compliant linkage element having first and second ends and disposed between the first and second rib portions of the associated rib element, the first and second ends each are coupled to the interior of a respectively associated one of the first and second rib portions; and a driving link having first and second driving link ends, the first driving link end is coupled to the interior of a selectable one of the first and second rib portions in the vicinity of the coupling of the respectively associated end of the first compliant linkage element, and the second end is arranged to receive a morphing force, the rib element is deformed in response to the morphing force.

Thus, each of the second ends of each of the driving links is coupled to the drive linkage for receiving a respective morphing force responsive to the driving force, whereby each of the plurality of rib elements is deformed in response to the respectively applied morphing force.

In a further embodiment, the first coupler element is provided with a slot in the linear actuator angularly arranged in relation to the longitudinal axis. The second coupler element is provided with a cam shaft engaged with the rotatory element for engaging in the slot in the linear actuator. Preferably, the cam shaft is rotatively coupled to the rotatory element via a bearing arrangement, such as a needle bearing.

There is additionally provided a variable camber compliant structure leading edge flap for dynamic stall alleviation. This flap modifies the baseline high performance rotor blade airfoil to provide 0° to 10° of flap motion for an 8.5% chord flap. The flap can be actuated at rates up to (and exceeding) 7 Hz to provide once per rev flap positioning. At the 10° position, the shape of the flap allows the airfoil to generate additional lift at higher angles of attack compared to the baseline (no flap) airfoil. The compliant leading edge flap provides up to a 35 percent increase in retreating blade lift with no stall and no negative hysteresis in lift, pitching moment, and drag. This technology has the capability to increase the combination of top speed, maximum payload, and altitude capability of all rotorcraft.

The addition of the flap necessitates that the D-spar be moved rearward 8.5% to make room for the compliant structure and actuator hardware. The total peak power consumed by the flap (under aerodynamic loading and 6 Hz actuation rate) is estimated to be 885 Watts for a 7 foot span flap. The total weight of this 7 foot flap is estimated to be 13.8 lb excluding the linear electromagnetic actuator. The total weight including the linear electromagnetic actuator is estimated to be 33.8 lb with the majority of the system mass located at the base of the rotor—away from high centrifugal loads

BRIEF DESCRIPTION OF THE DRAWING

Comprehension of the invention is facilitated by reading the following detailed description, in conjunction with the annexed drawing, in which:

FIG. 25 is a simplified schematic representation of a standard airfoil having actuators that urge a thickening of the airfoil;

FIG. 26 is a simplified schematic representation of the standard airfoil of FIG. 25, showing the airfoil in thickened condition.

DETAILED DESCRIPTION

Figure 1:
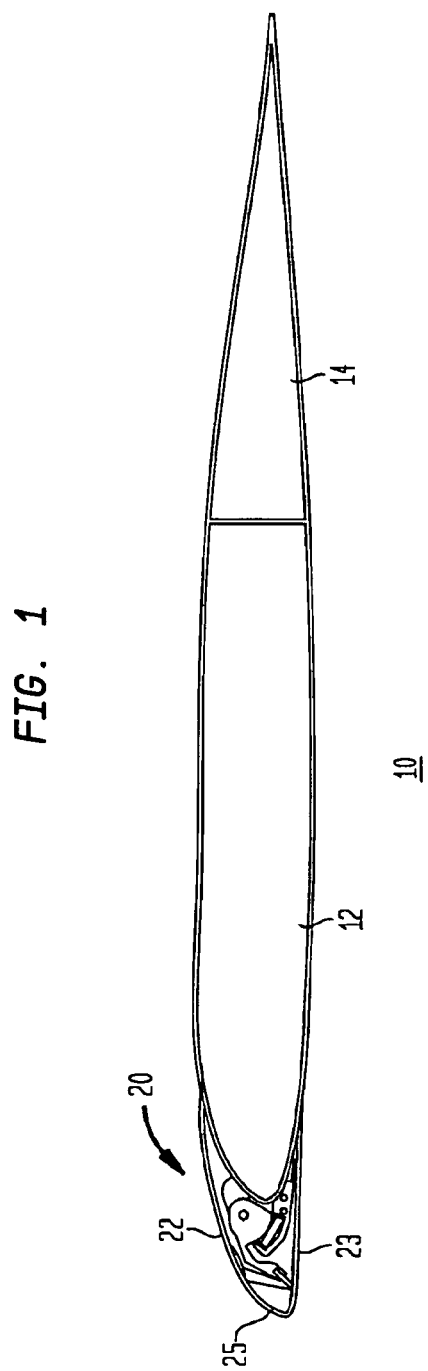
FIG. 1 is a cross-sectional representation of a rotor blade having a deformable leading edge constructed in accordance with the principles of the invention.

FIG. 1 is a cross-sectional representation of the rotor blade 10 having a deformable leading edge 20. As shown in this figure, rotor blade 10 is additionally provided with a central supporting D-spar 12 and a trailing edge 14. The deformable leading edge has an overlying compliant cover having an upper portion 22, a lower portion 23, the upper and lower portions being joined at a central forward portion 25.

Figure 2:
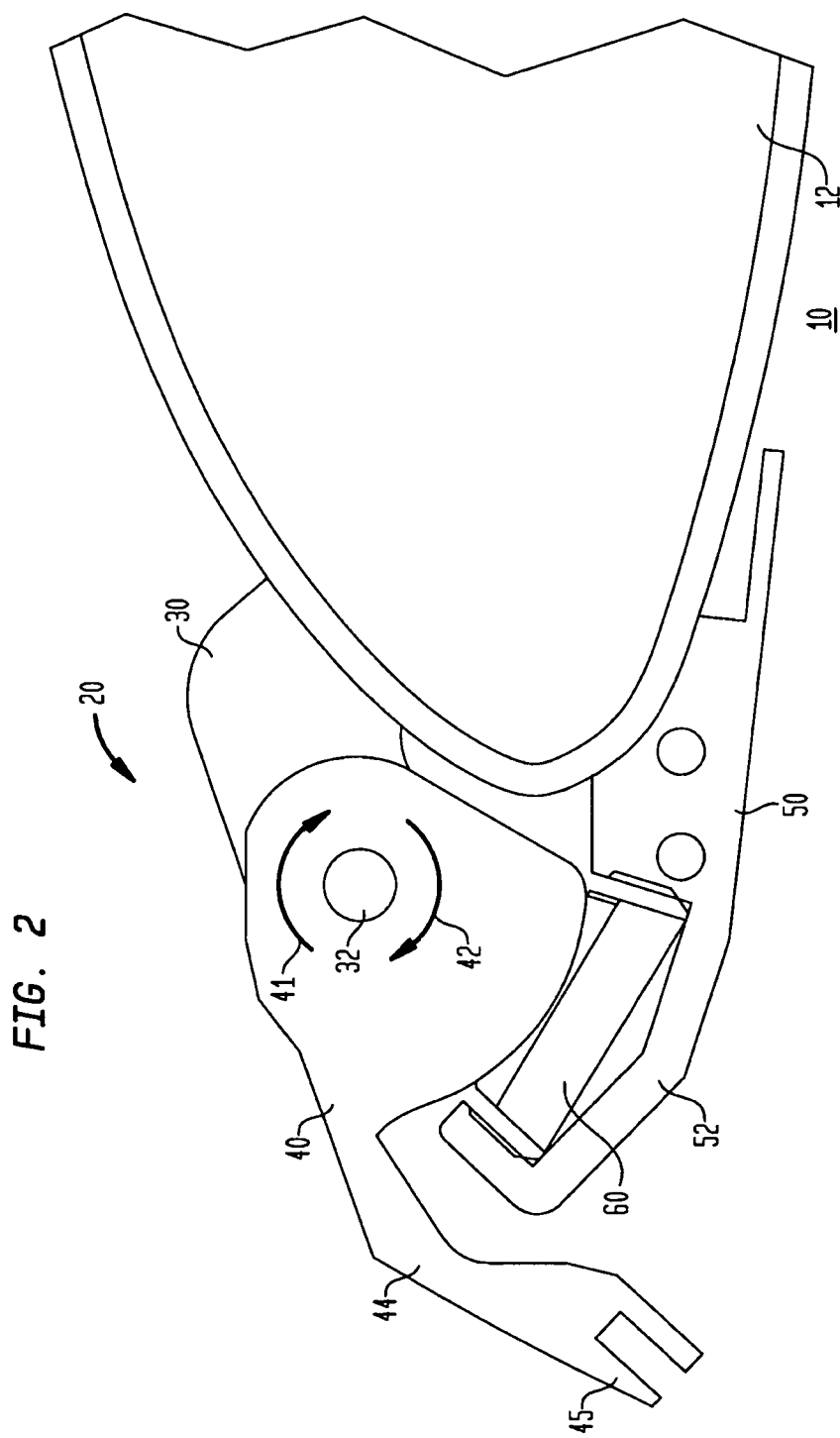
FIG. 2 is a is a cross-sectional representation of the deformation arrangement of the rotor blade of FIG. 1 without the overlying deformable cover.

FIG. 2 is a cross-sectional representation of deformation arrangement 20 of rotor blade 10, the deformation arrangement being enlarged to show structural details. The overlying deformable cover has been removed in this figure.

As shown in FIG. 2, D-spar 12 has attached thereto a support 30 having a pivot 32 to which is attached a rotatory element 40 that it is rotatable about pivot 32 in the direction arrows 41 and 42. Rotatory element to 40 has integrally form therewith an arm portion 44 to which it is attached a coupler portion 45. Rotatory element 40 it is rotatable in response to the longitudinal motion of a cam bar 60. The cam bar is supported by a cam system support 50 having a cam bar support portion 52. In this figure, cam bar 60 is movable longitudinally in and out of the plane of the drawing.

Figure 3:
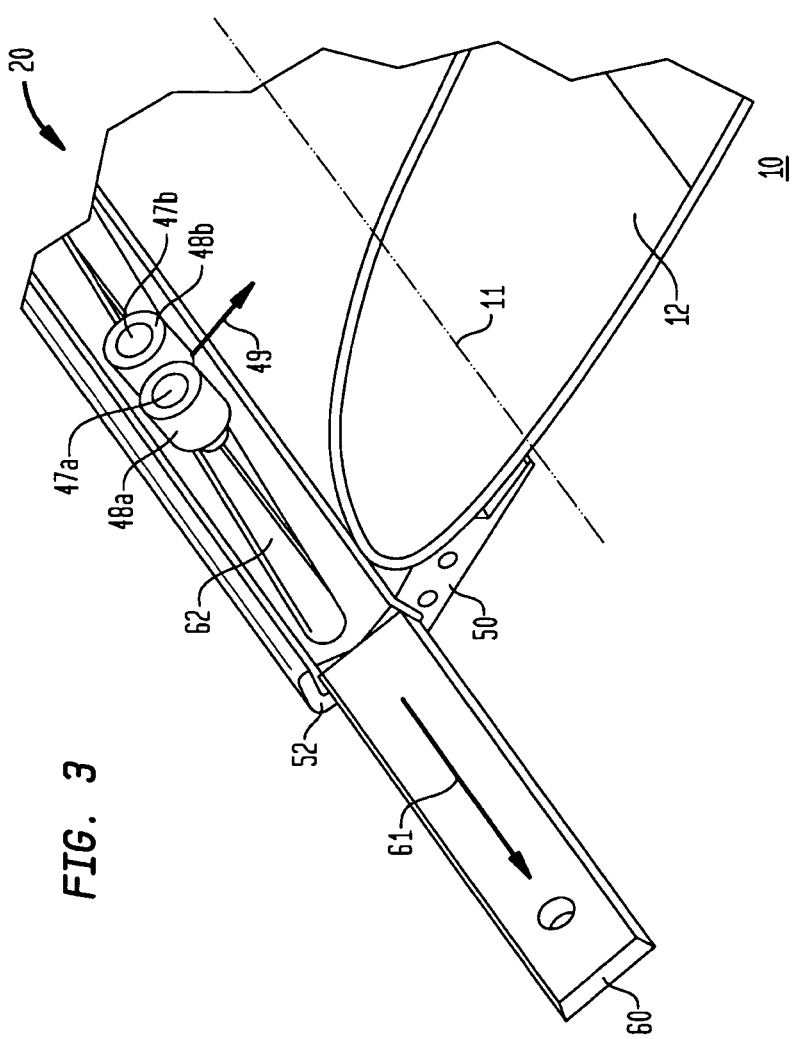
FIG. 3 is an isometric representation of a portion of the deformation arrangement of the rotor blade of FIG. 1 without the overlying deformable cover that is useful to illustrate the manner by which longitudinal motion is converted to rotational displacement.

FIG. 3 is an isometric representation of a portion deformation arrangement 20 of rotor blade 10 of FIG. 1. Elements of structure that have previously been described are similarly designated. In this figure, the overlying deformable cover is not shown for sake of clarity. In addition, rotatable element 40 is not shown, but there are shown cams 47a and 47b that are attached to the rotatable element via needle bearings 48a and 48b that facilitate the rotation of the cams. Cams 47a and 47b are shown to be engaged in a slot 62 of cam bar 60. The cams, as will hereinafter be described, are fixed longitudinally in longitudinal relation to longitudinal axis 11 of rotor blade 10, and therefore, as cam bar 60 is displaced in the direction of arrow 61, the cams are displaced transversely in the direction of arrow 49.

Figure 4:
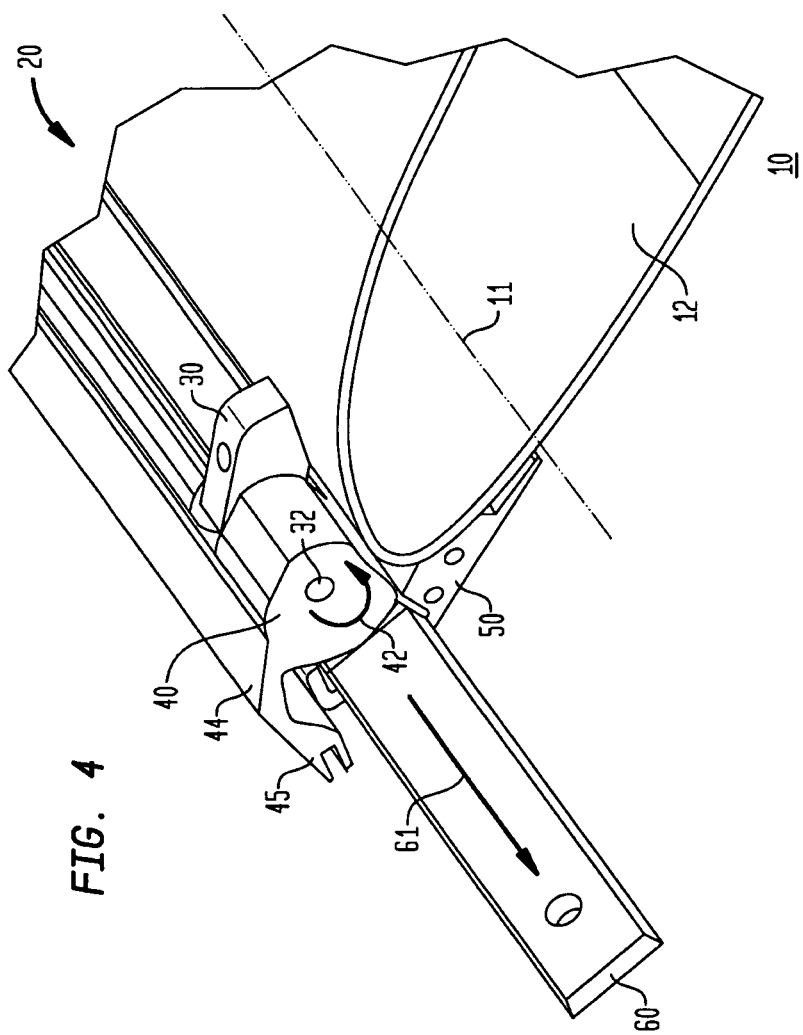
FIG. 4 is an isometric representation of a portion of the deformation arrangement of the rotor blade of FIG. 1 without the overlying deformable cover that is useful to illustrate the manner by which longitudinal motion is converted to rotational displacement.

FIG. 4 is an isometric representation of a portion of the deformation arrangement of rotor blade 10 of FIG. 1 with the overlying deformable cover having been removed. Elements of structure that have previously been described are similarly designated. This figure shows that as cam bar 60 is urged in the direction of arrow 61, rotatory element 40 is rotated about pivot 32 in the direction of arrow 42. Thus, arm portion 44 and coupler portion 45 are moved downward. Conversely, when cam bar 60 is urged in a direction opposite to that indicated by arrow 61, rotatory element 40 is rotated in a direction opposite to that indicated by arrow 42, and coupler portion 45 is correspondingly urged upward.

Figure 5:
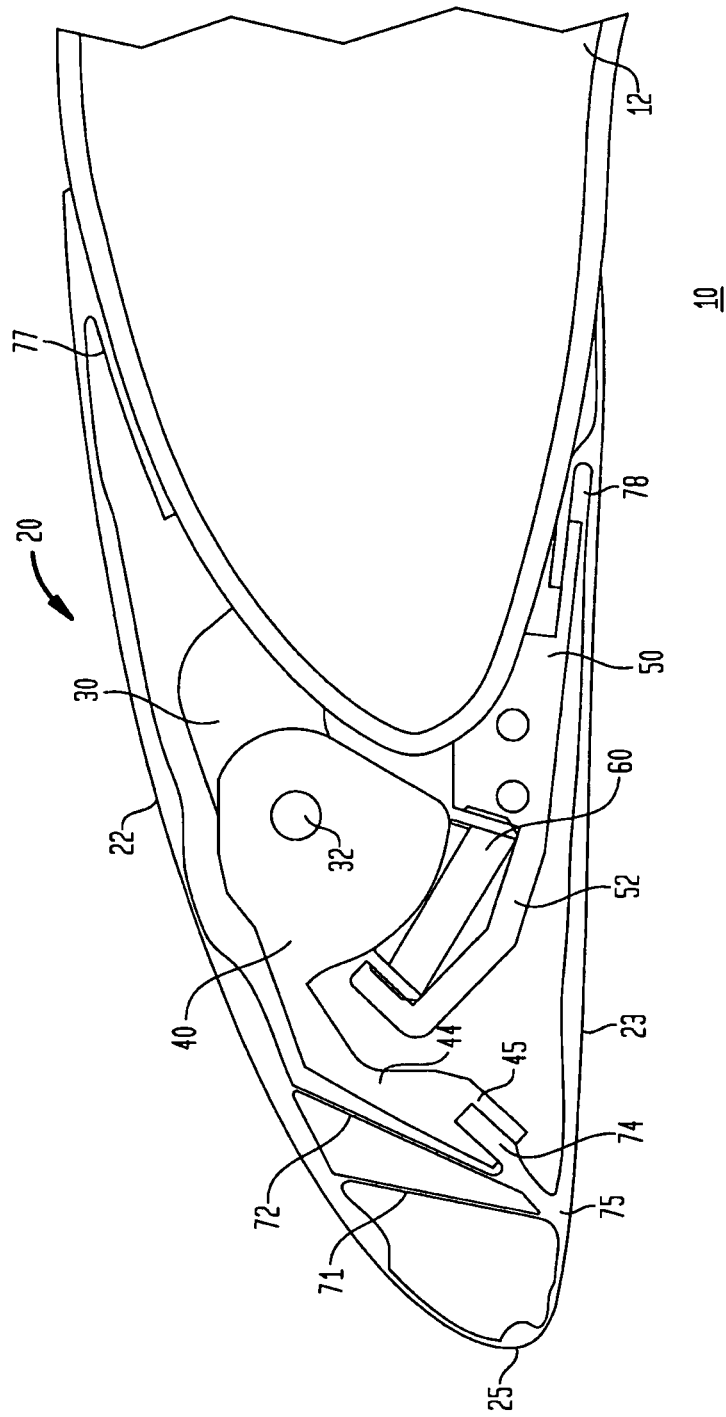
FIG. 5 is a is a cross-sectional representation of the deformation arrangement of the rotor blade of FIG. 1 showing the deformable portion of the rotor blade in substantially neutral orientation.

FIG. 5 is a cross-sectional representation of the deformation arrangement of rotor blade 10 of FIG. 1. Elements of structure that have previously been described are similarly designated. In this figure, the deformable cover is installed to form the leading edge of rotor blade 10. The deformable cover consists of an upper portion 22 and a lower portion 23 that are joined together at a frontal portion 25. Upper portion 22 is a fixedly coupled to D-spar 12 at coupling juncture 77. Lower portion 23, however, is slidably coupled to D-spar 12 at sliding juncture 78. There are additionally shown in this figure web structures 71 and 72 (shown in cross-section) that are coupled at respective upper ends to upper portion 22 of the deformable cover, and at lower ends of thereof to lower portion 23 at a juncture 75 of a drive link 74. Drive link 74 is shown to be coupled to coupler portion 45 of rotatory element 40. As cam bar 60 is urged a longitudinally along cam bar support portion 52, rotatory element 40 it is rotated, as hereinabove described, whereupon coupler portion 45 of the rotatory element urges drive link 74 upward and downward.

Figure 6:
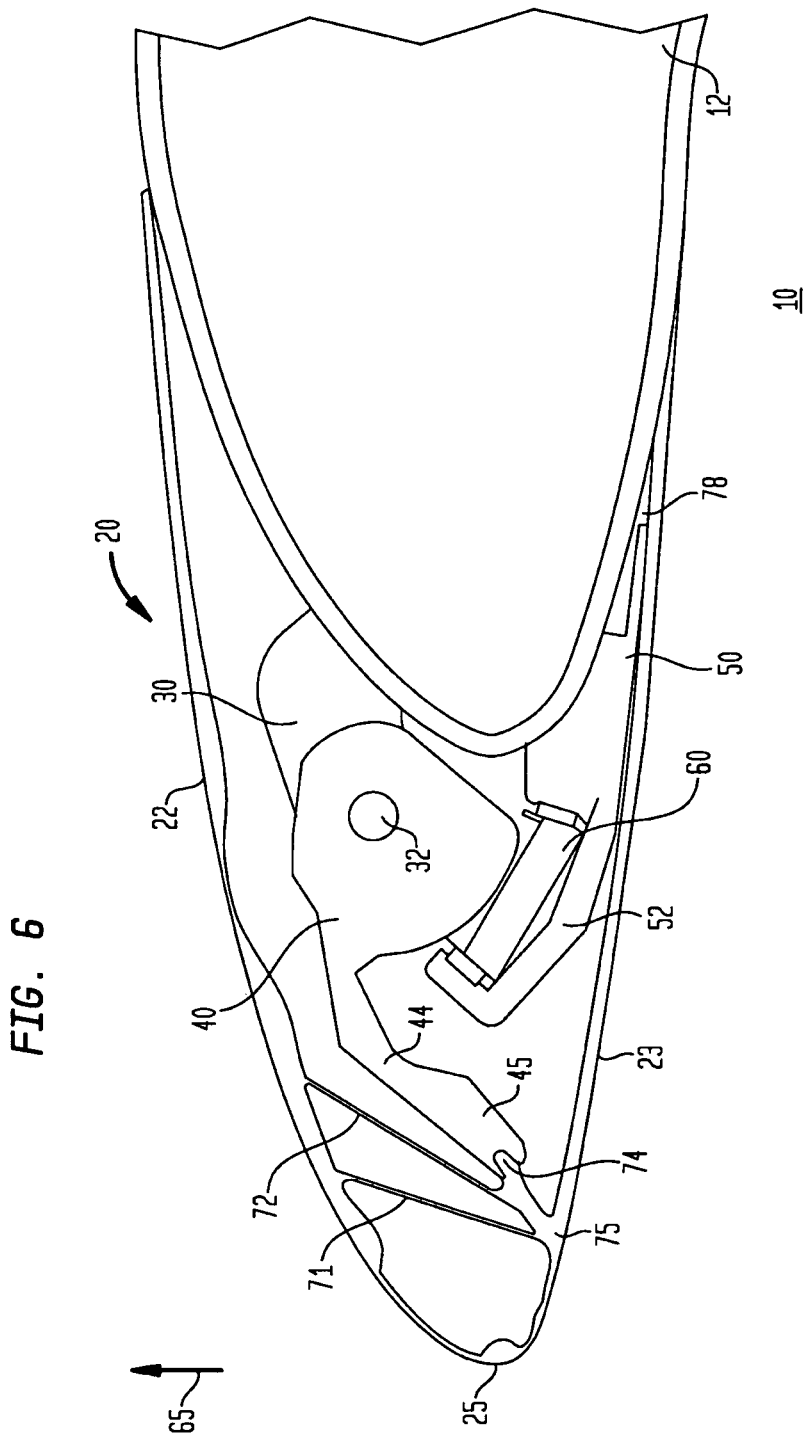
FIG. 6 is a is a cross-sectional representation of the deformation arrangement of the rotor blade of FIG. 1 showing the deformable portion of the rotor blade in a slightly upward orientation.

FIG. 6 is a is a cross-sectional representation of the deformation arrangement of rotor blade 10 of FIG. 1 showing the deformable portion of rotor blade 10 in a slightly upward orientation. In this representation, cam bar 60 has been urged into the plane of the figure (i.e., opposite to the direction indicated by arrow 61 of FIG. 3) whereby arm portion 44 and coupler portion 45 are urged upward. This results in forward portion 25 of the overlying compliant cover to be raised in the direction of arrow 65.

Figure 7:
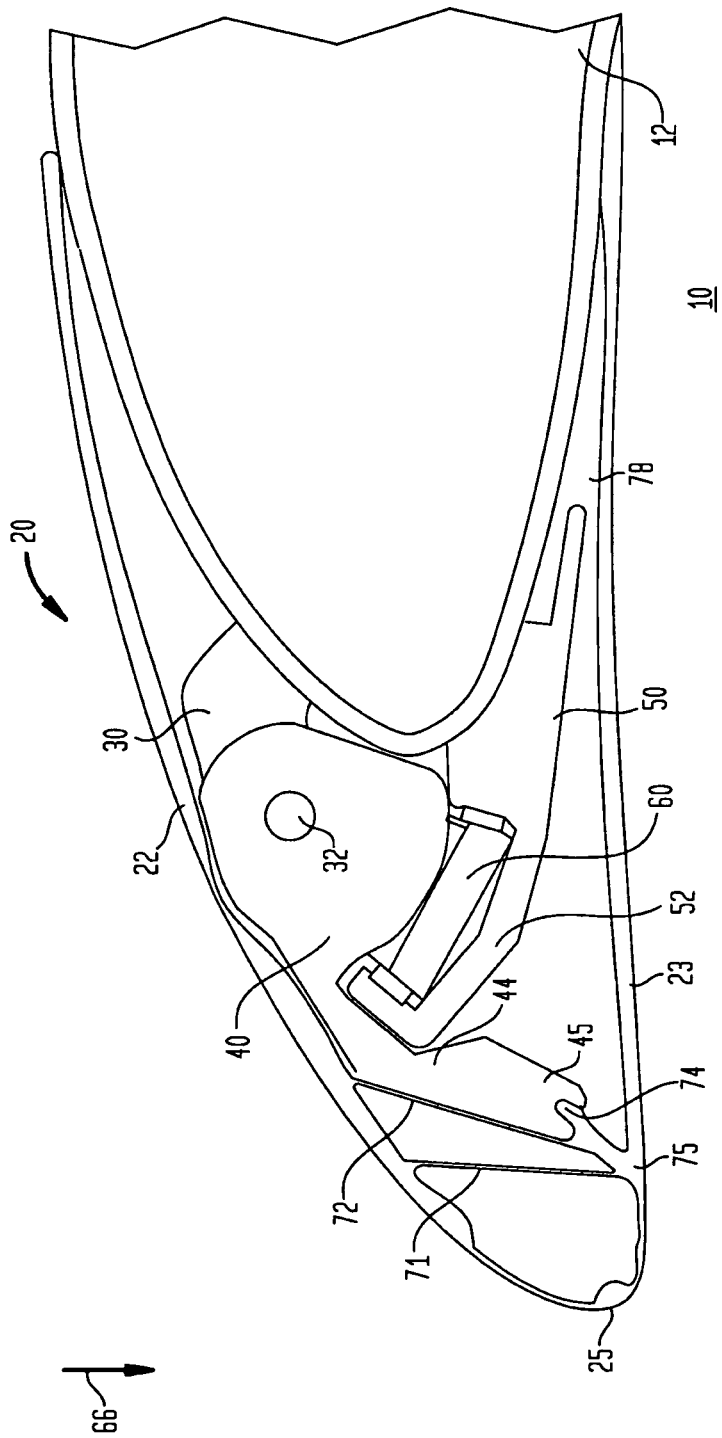
FIG. 7 is a is a cross-sectional representation of the deformation arrangement of the rotor blade of FIG. 1 showing the deformable portion of the rotor blade in a slightly downward orientation.

FIG. 7 is a is a cross-sectional representation of the deformation arrangement of rotor blade 10 of FIG. 1 showing the deformable portion of rotor blade 10 in a slightly downward orientation. Elements of structure that have previously been discussed are similarly designated. In the orientation of elements indicated by this figure, cam bar 60 has been urged out of the plane of the figure (i.e., in the direction indicated by arrow 61 of FIG. 3) whereby arm portion 44 and coupler portion 45 are urged downward. This results in forward portion 25 of the overlying compliant cover to be lowered in the direction of arrow 66. With reference to FIGS. 6 and 7, it is seen that deformation arrangement 20 is deformable in relation to the motion of cam bar 60 to achieve a compliant structure leading edge for the rotor blade of a helicopter (not shown). More specifically, and as noted herein, deformation arrangement 20 modifies the baseline air foil aspects of high performance rotor blade 10 airfoil to provide 0° to 10° of flap motion for an 8.5% chord flap. The flap can be actuated at rates exceeding 7 Hz to provide flap positioning once during each revolution. At the 10° position, the shape of the flap allows the airfoil to generate additional lift at higher angles of attack compared to the baseline (no flap) airfoil. In the practice of the invention, the compliant leading edge flap provides up to a 35% increase in retreating blade lift with no stall and no negative hysteresis in lift, pitching moment, and drag. This technology has the capability to increase the combination of top speed, maximum payload, and altitude capability of all rotorcraft.

Figure 8:
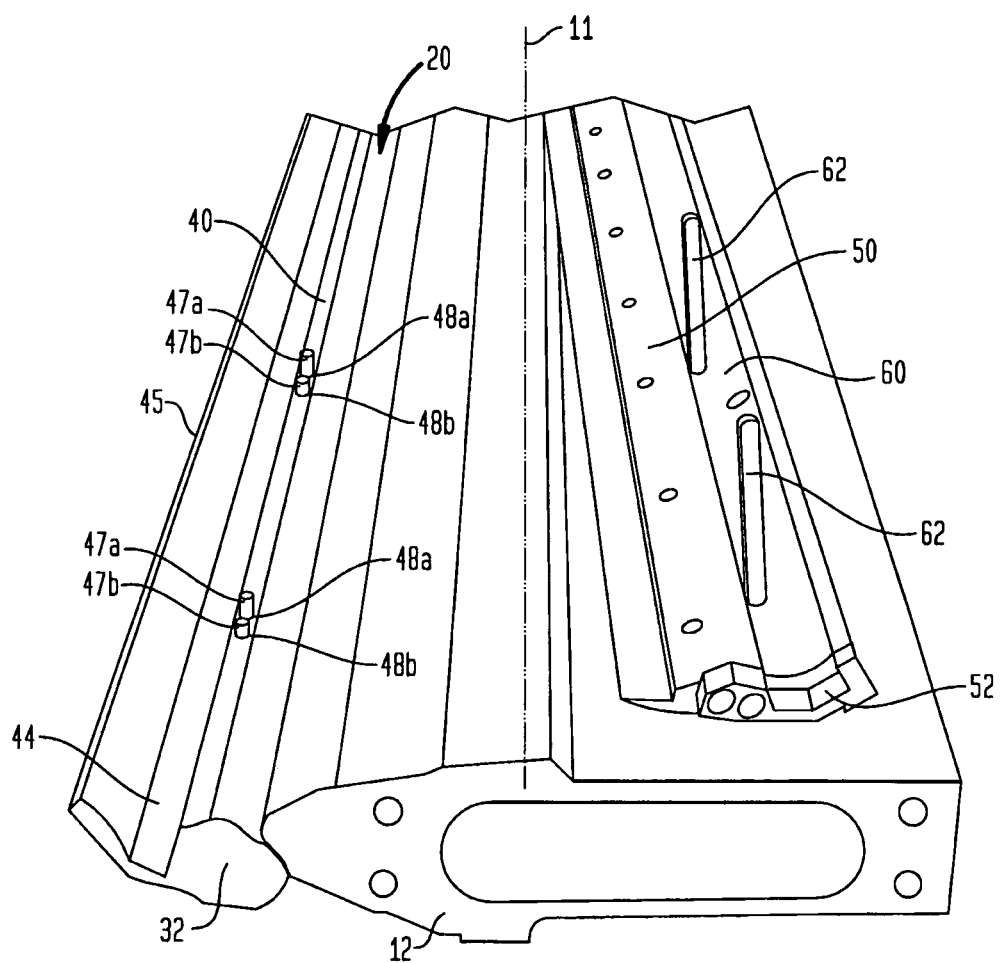
FIG. 8 is a perspective representation of the deformation arrangement of the rotor blade of FIG. 1 in disassembled condition.

FIG. 8 is a perspective representation of a model segment the deformation arrangement of rotor blade 10 of FIG. 1, in disassembled condition. Elements of structure that have previously been discussed are similarly designated, and the overlying compliant cover is not shown in this figure. As can readily be seen in this figure, rotatory element 40 is, in this specific illustrative embodiment of the invention, longitudinally elongated and continuous. Similarly, arm portion 44 and coupler portion 45 are coextensive therewith in this embodiment. Also in this figure, cams 47a and 47b are shown to depend from the underside of rotatory element 40 and are coupled thereto via respectively associated ones of needle bearings 48a and 48b. The cams 47a and 47b are arranged to engage with slots 62 of cam bar 60, which is disassembled from D-spar 12 in this figure so that the structure of cam bar 60 within cam bar support portion 52 of cam system support 50 can be illustrated.

Figure 9:
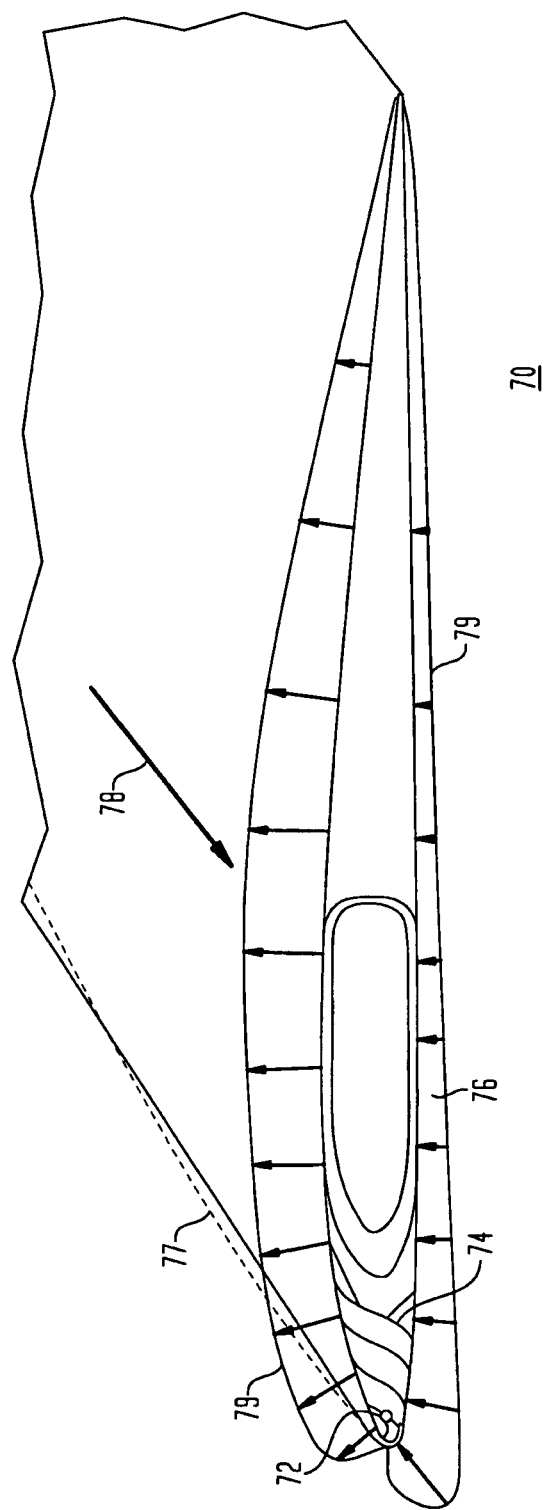
FIG. 9 is a diagram that illustrates the three-dimensional, time-varying loading that is experienced by the leading edge flap.

FIG. 9 is a diagram that illustrates the three-dimensional, time-varying loading that is experienced by leading edge flap 70. As shown in this figure, the leading edge flap system consists of a suitable actuation system (not shown), an optional actuator transmission (not shown) (to convert push-pull motion appropriate for the flap mechanism) via actuator push rod 72, and a compliant structure flap 74 that must undergo the required shape change while resisting pressure loads and acceleration forces and accommodating flex in primary D-spar 76. The flexure of D-spar 76 is represented in the drawing by outline 77. This requirement to change shape occurs at moderate speed (7 Hz) and thus the loads and boundary conditions will change in at least this rate (higher harmonics are possible). Note that mechanism dynamics will also need to be considered when actuation occurs at these speeds.

Centrifugal force in this specific illustrative embodiment of the invention, is directed as indicated by arrow 78.

Material Selection—Strength and Fatigue Considerations

High performance materials for compliant structures primarily include materials with a high modulus and high strain capacity that directly translates to materials with high strength limits, and particularly fatigue strength. High strength titanium alloys and carbon fiber reinforced polymers (CFRP) represent preferred high performance materials, especially in embodiments of the invention wherein weight is a factor. Given the 4500 hour blade operating requirement of a commercial helicopter rotorcraft, if the flap runs continuously at 7 Hz, the flap will be subjected to just over 110 million cycles over its lifetime. Applying a fatigue safety factor of 2 would require the structure to survive roughly 220 million cycles. A readily available titanium alloy, Ti-6Al-4V, has a yield strength of 880 MPa and a $10^7$ fatigue cycle strength of 510 MPa.

Additionally, other titanium alloys that might increase static and fatigue strength include a Ti—1OV-2Fe-3A1 that is possessed of superior static and fatigue strength. This alloy has a yield strength of 174 ksi (1200 MPa) and a 145 ksi (1000 MPa) 1E6 cycle fatigue strength that extrapolates to a 75 ksi (517 MPa) fatigue strength at 220 million cycles.

Fixed-Free Medial Strain Design

Topology Optimization Fixed-Free Design Conclusions

At a 7 Hz sinusoidal operation, the lower translating joint topology optimized design requires a maximum of 0.127 HP/fl (310 Watts/m) peak power per unit length. If 6.7 ft (2 m) of the rotor blade has an adaptive structure leading edge flap, the compliant leading edge requires 0.85 HP or 621 Watts peak power to drive the entire flap (the average cyclic power would be much lower). This required peak power is only 5% below the maximum rated power output capability of the Aerotech BLUMUC-79 linear electromagnetic motor, which achieves a maximum of 0.87 hp or 650 Watts for a 6.22 in (158 mm) long actuator. Note that the power analysis is conservative (no frictional forces) such that the average total power is zero if one integrates over one complete cycle. Frictional forces will cause power losses during operation of the flap, so a slightly larger (longer, more powerful stator) may be required to provide additional actuator power.

Structural Analysis

Lateral Acceleration Loading

The 1000 G loading was originally estimated from a 20 ft blade radius spinning at 7 Hz rotation rate. In order to develop a more accurate acceleration value, the rotor diameter and tip speeds for a range of military helicopters are shown in Table 1, which illustrates three different helicopter models that encompass a range of lift and speed performance.

TABLE 1

Listing of Various Helicopter Specifications

| Helicopter | Blade Radius (ft) | Hover Tip Speed (ft/sec) | Rotation Rate (Hz) | Blade Tip Lateral Acceleration (G) |
|---|---|---|---|---|
| Blackhawk UH-60A | 26.75 | 725 | 4.31 | 612 |
| Cobra AH-1S | 22.0 | 746 | 5.41 | 789 |
| Super Stallion CH-53E | 39.5 | 732 | 2.95 | 422 |

Based on the data for a range of high speed transport, fighter (ground support) and heavy lift helicopters, the inventors herein have determined that the maximum tip acceleration should be reduced slightly to 800 Gs to represent a more maneuverable, higher disk loading helicopter like the Cobra.

Three-Dimensional Simulation

Detailed (continuum) three-dimensional simulation of the leading edge structure was reexamined to assess the stresses/strains in an individual compliant rib due to pressure loading and centrifugal loading. An equivalent stress plot is shown in FIG. 9 of the model in the 0° and 10° flap position, with maximum pressure load and 800 G lateral acceleration.

Actuator Selection

One method of actuating the leading edge flap is to provide longitudinal motion along the rotor blade span using a push rod (or a rod in constant tension). This method allows an actuator to be located inboard away from high centrifugal force locations.

While investigating various actuation strategies, the motion of the actuator (linear, rotary, or other) along with the system packaging must be considered in order to develop an appropriate method for coupling the motion of the actuator together with the compliant structure. Ideally, the location of the actuator helps leverage (or increase the stiffness of) the leading edge system as much as possible. This may be required in order to maintain a high structural stiffness and integrity (with respect to any undesirable aero-elastic phenomenon such as a critical divergence or shape change due to aerodynamic pressure loads). The actuator characteristics can then be input into the compliant mechanism design algorithms to optimize the system performance.

Information and data of (a) rotary actuators, (b) linear actuators, (c) with or without a speed reduction transmission, (d) embedded actuation concept, and (e) alternative actuation schemes has been compiled. The ultimate actuator choice depends on many factors including: reliability/durability, force/displacement required to drive the compliant LE, need for a transmission system, packaging, weight (including drive electronics) and power capability. Different solutions may exist due to the specific consideration (criterion) and trade-offs.

Power density (power per weight, power per volume, power per span) is one important factor for selecting actuators. But other factors must be considered to determine whether an actuator is feasible for the application. All actuators studied are subjected to dimension restrictions necessitated by the small space available at the leading edge. According to the power density data, the ultrasonic rotary motor and linear inchworm actuator can be ruled out because with required size, they can not generate enough power to actuate the leading edge system. Moreover, the life of ultrasonic rotary motors is typically less than 2000 hours and is much too short for deformable rotor blade applications. Also, the operating temperature of linear inchworm actuators is very limited (due to thermal expansion and tolerancing issues) and could not cover the possible temperature ranges of the helicopters.

Linear electromagnetic actuators, voice coil actuators and piezoelectric actuators all generate linear output motion; however, output forces and output displacements of these actuators are dramatically different. Piezoelectric actuators are compact and generate very large forces, but the output displacement is on the order of microns. Efficient amplification mechanisms are needed to enlarge the output motion and trade force for displacement (power losses will be created due to the amplification mechanism). Voice coil actuators can generate significantly larger displacement than piezoelectric actuators; however, the output force is much smaller. Linear electromagnetic actuators can generate moderate output forces and large output displacements. However, the size of the linear electromagnetic actuators may be prohibitive for use in the leading edge flap application (slightly smaller motors may be fabricated). Rotary DC motors are compact and powerful enough to meet the application needs. Small brushless DC motors and their accessories are commercially available, and proven to operate continuously for up to 20,000 hours. Because of continuous rotational motion, they generate less vibration and are easy to control.

Actuator Linear to Rotational Transmission System

The space available within the leading edge is extremely tight, such that careful system packaging and component selection will be necessary to develop a compact enough transmission that enables high power efficiency and capacity to handle the roughly 700 Watts of power (at 7 Hz). In addition, the shape change performed by the flap further reduces the available space for actuation components.

Figure 10:
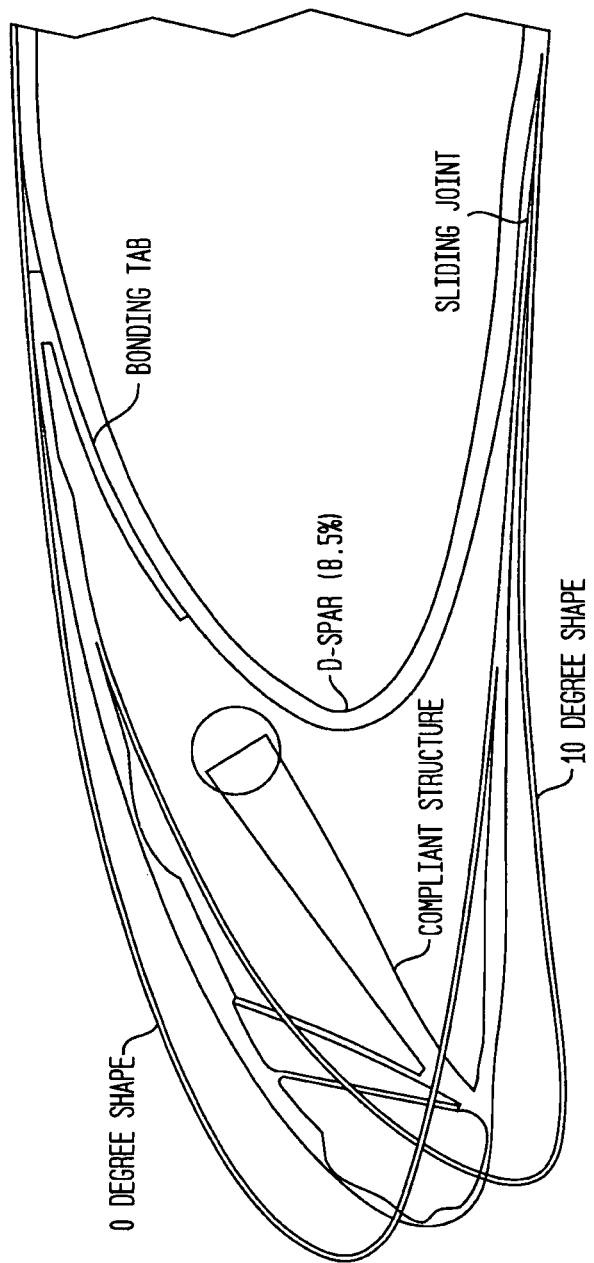
FIG. 10 is a representation of a CAD model of leading edge flap and D-spar.

FIG. 10 is a representation of a CAD model of leading edge flap and D-spar. The transmission system must transform the linear actuation motion to rotary motion to drive the flap position. The preferred method is to develop a cam and wedge system to perform the linear to rotational transformation. Tight space constraints and high power requirements dictate careful selection of components to develop a durable system.

Bearings are selected to maintain compact and high load carrying capacity (static and dynamic). Bending, shear, and contact stresses for the cam-roller system are estimated using strength of materials and Hertzian stress calculation approaches. All highly loaded components are fabricated from precision-ground, hardened steel to meet static and cyclic strength requirements.

The cam-wedge system is tailored to provide the correct mechanical advantage given the actuation system characteristics to optimize the force/velocity operating conditions of the linear actuation system. Currently, the wedge system is designed with a 4° slope, which requires a 943 N (212 lb) maximum force requirement from the actuation system for a 2 meter span flap (static force calculation at 10° deflection and maximum pressure loading). The linear actuation travel to move the flap 0° to 10° is 3.0 inches (±1.5 inches) requiring a maximum actuation velocity of 1.68 m/s (66.0 mis)—assuming a sinusoidal displacement profile. This peak velocity of 1.68 mis is well within the terminal velocity capability of the linear motor system, which is approximately 17.8 mis (700 mis).

Figure 11:
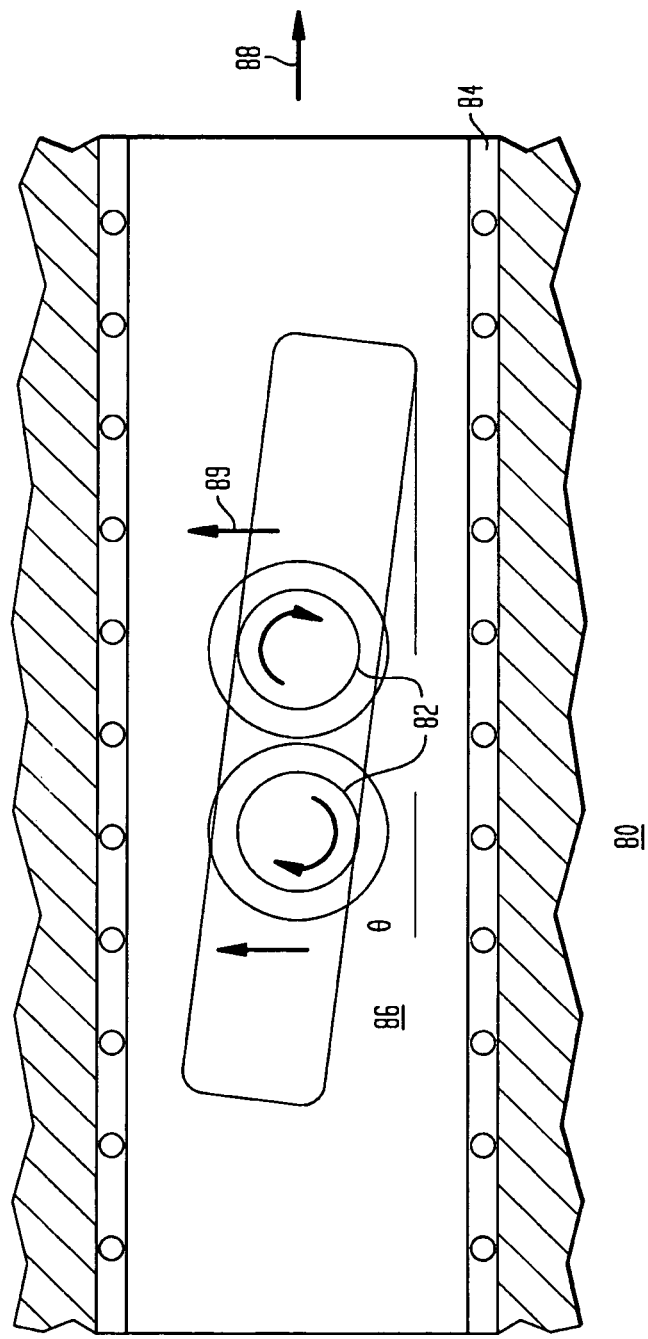
FIG. 11 is a simplified schematic representation of the cam wedge system.

FIG. 11 is a simplified schematic representation of cam wedge system 80 that is designed so that only one of dual cam rollers 82 is loaded for a particular flap moment loading (positive or negative). The cam system is also designed to provide smooth, low friction motion of the tension rod (linear actuation system) and flap rotary motion by avoiding sliding surfaces and providing pure rolling motion, via linear slide bearings 84 for flap movement. As shown, rotary flap motion is, in this illustration, shown to be rotationally displaced by a wedge angle 86 having a value θ. Linear motion is, in this embodiment, directed as indicated by arrow 88, and rotary flap motion is indicated by arrows 89.

Currently the bearing-shaft system has been sized to handle the flap maximum moment loading of i6 in-lb per inch span of flap (1260 in-lb for a 79 inch flap span) and the wedge system is designed to provide the total 0.38 radians of rotational motion (21.77°) at the base of the arm (not shown) that drives the compliant structure.

Figure 12:
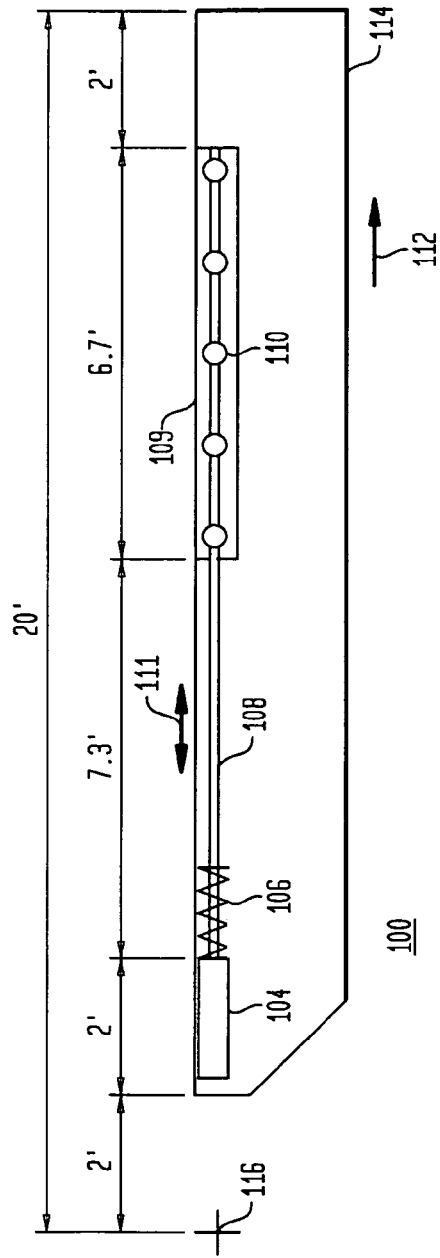
FIG. 12 illustrates the actuator layout and representative length scale with respect to the rotor blade span.

FIG. 12 is a simplified schematic representation of a rotor blade 100, that illustrates the layout of actuator 104 and representative length scale with respect to the rotor blade span. Rotor blade 100 is shown in this figure to have actuator 104 coupled via a balancing spring 106 and a tension rod 108 to a cam system 110 that converts linear to rotary motion, which is applied to compliant flap 109. The actuator is configured in this embodiment to produce motion in accordance with arrow 111. Centrifugal force is shown to be in the direction of arrow 112, toward rotor blade tip 114. The hub of the rotor blade is designated as 116.

Given the CAD and finite element models, one can extract the key mass and stiffness values for the flap system. The table below outlines key values for the features present in the flap model.

TABLE 2

Volume, Mass, and Moment of Inertia Values for the Current Generation CAD Leading Edge Flap Model.

| COMPONENT | MATERIAL | VOLUME (IN$^3$) | MASS (IB$_M$) | MOMENT OF INERTIA (IBM-IN$^2$) |
|---|---|---|---|---|
| ROTATING COMPONENTS | | | | |
| Compliant Leading Edge | Titanium + GFRP | 18.8331 | 2.5984 | 0.0233 |
| Crank Arm | Titanium | 23.794 | 3.8072 | 0.7691 |
| Radial Bearings | Steel | 0.136 | 0.0386 | |
| Thrust Bearings | Steel | 0.47 | 0.1316 | |
| LINEAR MOTION COMPONENTS | | | | |
| Linear Wedge | Steel | 11.6780 | 1.1496 | NA |
| Linear Needle Bearings | Steel | 0.42 | 0.1241 | NA |
| Tension Rod | CFRP | 31.667 | 2.0584 | NA |
| Actuator Stator | Iron | | TBD | NA |
| FIXED COMPONENTS | | | | |
| Crank Arm Mount | Titanium | 3.5535 | 0.5686 | NA |
| Linear Raceway | Titanium | 11.6780 | 1.8685 | NA |

System 2 Results

Figure 13:
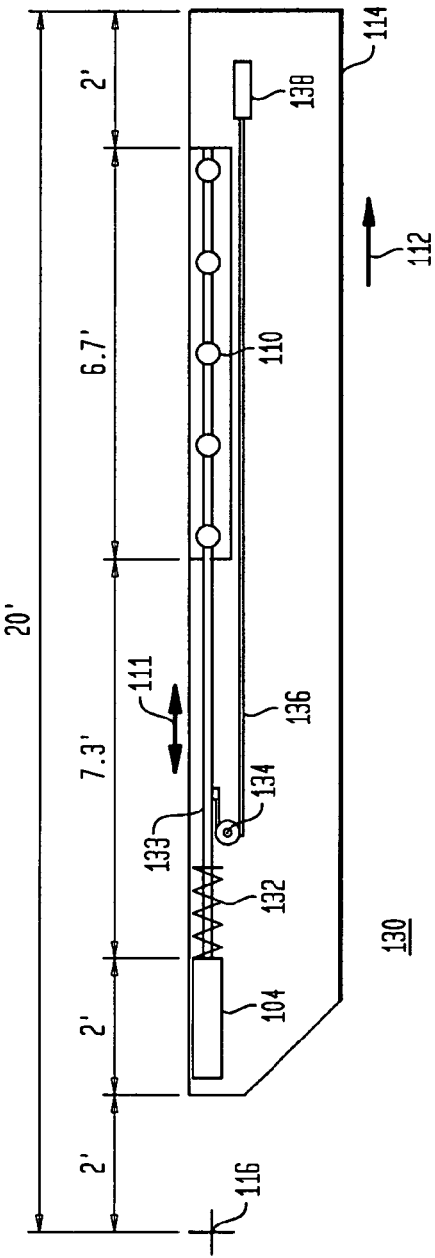
FIG. 13 is a schematic representation of a modified flap-actuator.

FIG. 13 is a simplified schematic representation of a modified flap-actuator 130. Elements of structure that have previously been discussed are similarly designated in this figure. Actuator 104 is coupled via a tuning spring 132 to tension rod 133. As compared to the embodiment of FIG. 12, the embodiment of FIG. 13 has a redirection pulley 134 that is coupled to a second tension rod 136. Tension rod 136 has, in this embodiment, a balancing weight 138 affixed thereto distal from redirection pulley 134.

The modification represented in FIG. 13 is generates a steady offset of the centrifugal force without requiring a heavy and stiff balancing spring. Since the no-flap zone in the last 10% of the rotor blade span and because of the high G loading here, a relatively small mass can be used to generate a balancing force to compensate for the centrifugal force, which is reversed in part by redirection pulley 134, which in some embodiments is configured as a rack and pinion (not shown) or as a pulley system. The linear tuning spring of the present embodiment has much more freedom to be "stiffness tuned" to minimize the impedance of the system at the desired operational frequency. In this manner, actuator force amplitude is reduced. Also, since the tuning linear spring is softer than a balancing spring, the actuator offset force can be significantly reduced. Analysis of the packaging space within the leading edge reveals that there is room to place the second thin tension rod 136, which may be configured in some embodiments to have ~⅛" cross-sectional diameter, and yet will have adequate strength and stiffness to support the balancing mass 138 located at rotor tip 114. Of course, balancing mass 138 adds additional weight and complexity to the system, but this additional weight is likely to be significantly less than the added mass of some 12 heavy-duty helical tension balancing springs.

As shown in FIG. 13, the linear actuator is located near hub 116 of the rotor blade, thereby isolating the actuator from high centrifugal loading. The linear actuator will transmit power to the leading edge flap using a tension rod where maximum stiffness of the transmission is obtained using a carbon fiber rod in tension/compression rather than torsion or bending (higher structural efficiency). A balancing spring will compensate for centrifugal loading acting on the tension rod.

The linear actuator motion will be transferred to rotary motion to drive the main rotary link using a cam-type system designed to be very compact, lightweight and stiff in the rotary direction. Along the flap span, there will be cam stations at intervals. Spacing should be determined based on component space, the mechanical advantage of the cam system (stroke of the tension rod Vs. rotation of the drive link), and the stiffness and allowable drag (damping) of the cam system.

It is an important aspect of the tension rod approach of the present invention that the actuation rod is always in tension. As such, therefore, the actuation force constitutes but a reduction in the tension in such an embodiment. This approach to the design of the system avoids buckling of the actuation rod, as would be the case with compression.

For the modified flap system, the instantaneous peak actuator power is reduced to 885 Watts compared to the previous design that had a peak actuator power of 2250 Watts. It is to be noted that the actuator force offset is negative (−120.25 lb) illustrating the need to apply negative (inward) actuator force in order for the flap to sit at a +5° offset (neutral position). Because of the frictional characteristic of the bearings and due to the proximity of the forced frequency to the first natural frequency, the force tends to spike and shift between sinusoidal amplitudes. The linearized friction characteristic has the effect of slightly changing the natural frequency of the system as the velocity vector changes.

Actuator Selection

Given the actuator force and power requirements, a linear electromagnetic motor from Anorad (Rockwell Automation) LC-50-300 and AeroTech LMX-382 linear actuator will satisfy the force requirements. The LC-50-300 motor has a theoretical peak power of 4420 Watts and the LMX-282 motor has a theoretical peak power of 2263 Watts. These actuators are larger than the originally specified AeroTech BLMU-79 that has a peak power output of 660 Watts but its force limited for this application (peak force is 29.2 lb). In this particular case, the force requirement of 150 lb peak force dictates the actuator size. A much smaller actuator could be utilized if the safety feature—providing 0° flap position when the actuator is disabled—is not needed (dictates the −120.25 lb steady state force to pull the flap to the 5° position). The Anorad linear motor displays a more compact, lighter design that can satisfy the force requirements (higher power density than a comparable AeroTech actuator). The dimensions and weight of this actuator are: 2.12"×3.15"15" and would weigh 15.5 lb (9.8 lbm is included in the dynamic analysis as the stator mass). Inboard mounting of the actuator would require a local bulge in the airfoil to accommodate the added volume forward of the D-spar. For further study, an electro-mechanical system analysis of the linear actuator could be used to detail the required operating voltages and currents.

CAD Design of Full-Scale Compliant Leading Edge Flap System

CAD Model and Rapid Prototype

Given the tight space constraints, high power requirements, and the limitations associated with selecting off-the-shelf bearings, shafting, etc. the leading edge spar was moved backward an additional 0.097 inches pushing the D-spar back to 9.0%. Bearings were selected to support the cam-wedge loads while operating (rolling) for the 220E6 cycles. Bending, shear, and contact stresses for the cam-roller system are estimated using strength of materials and Hertzian stress calculation approaches. Currently, the maximum contact stress is 301,511 psi (~2 GPa) for the cams at the 10° flap position with maximum pressure loading. There are a few specialty carburized and hardened steels that can meet these very high contact stress values.

Figure 14:
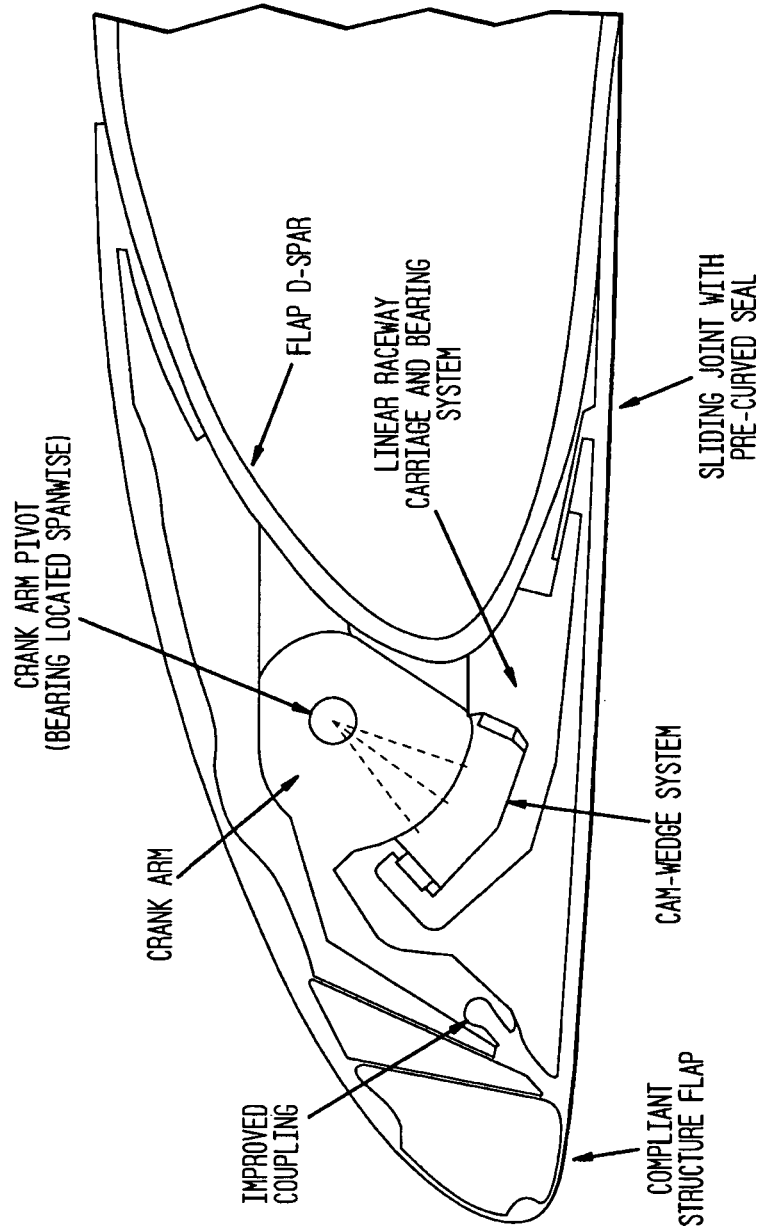
FIG. 14 is a CAD model of an improved leading edge flap cam wedge system and D-spar.

FIG. 14 is a CAD model of an improved leading edge flap cam wedge system and D-spar.

Figure 15:
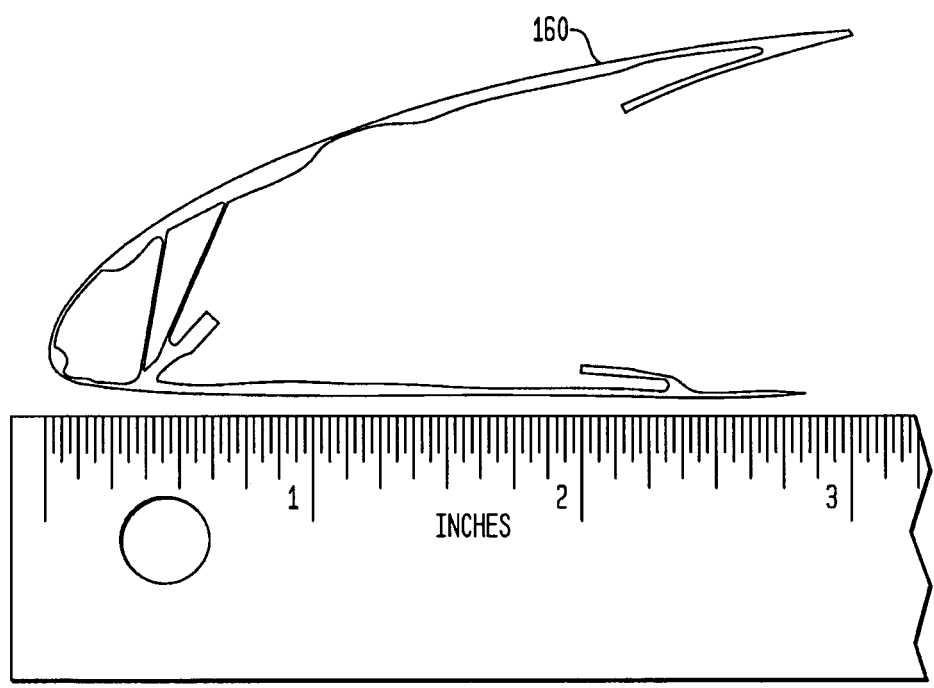
FIG. 15 is a representation of a sample wire EDM titanium rib.

FIG. 15 is a representation of a sample wire EDM titanium rib 160 depicted in relation to a measuring ruler (not specifically designated). As shown, titanium rib 160 has a cross-sectional length of approximately 3".

Figure 16A:
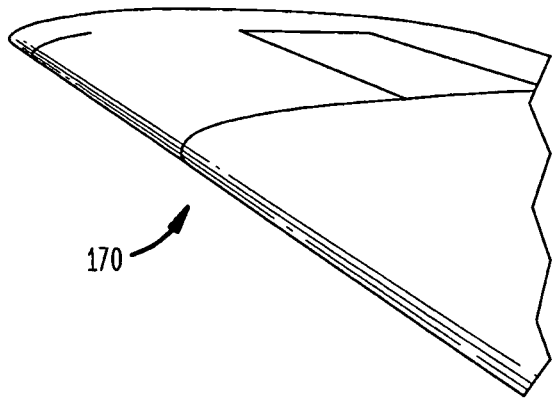
FIGS. 16(a) and 16(b) show the prototype model in 0° and 10° positions, respectively.
Figure 16B:
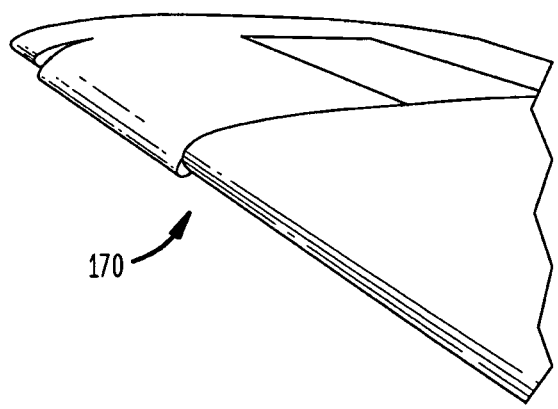

FIGS. 16(a) and 16(b) show a prototype model 170 of the present invention in 0° and 10° positions, respectively.

Figure 17:
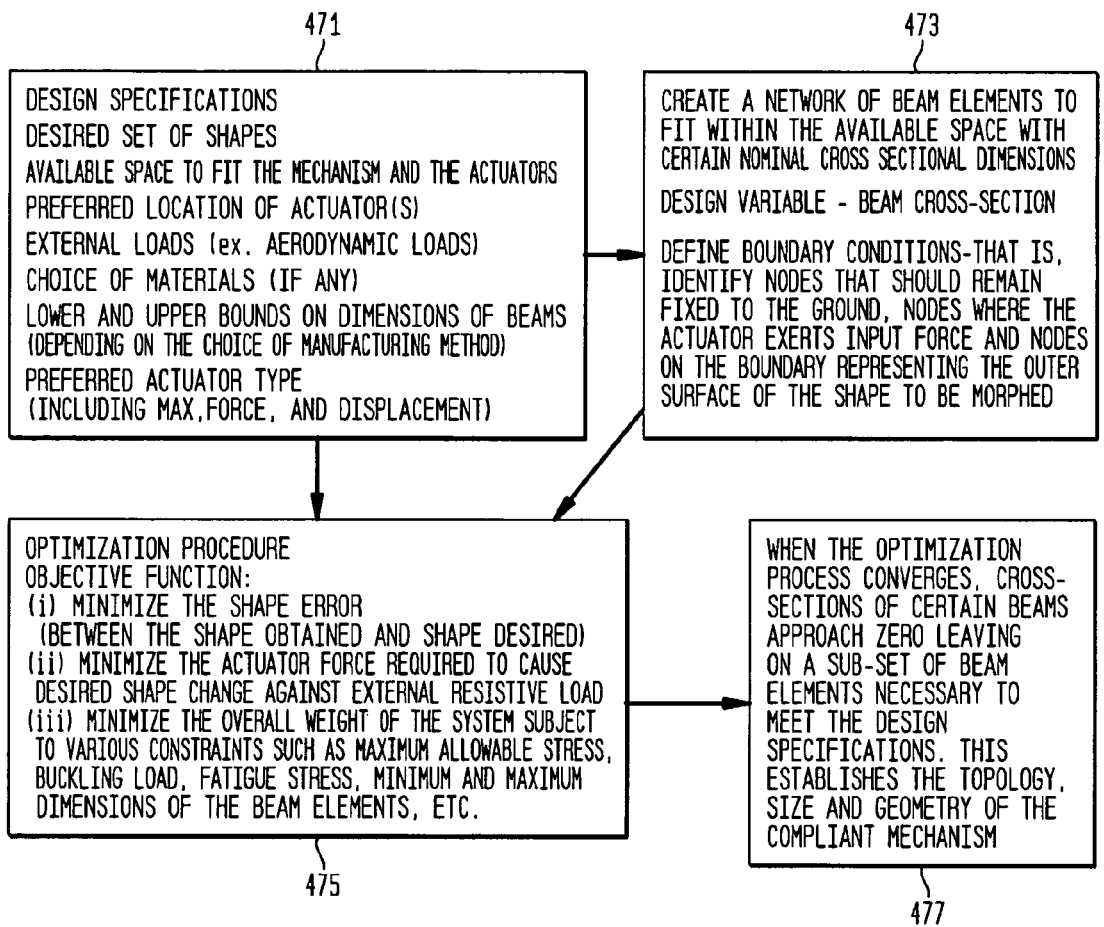
FIG. 17 is a block diagram of the design optimization procedure of the present invention.

FIG. 17 is a block diagram of the design optimization procedure of the present invention. As shown in this figure, the content of a function block 471 is used to commence the design process. This includes determination of the Design Specifications, which include determination of the:

Desired set of shapes;
Available space to fit the mechanism and the actuators;
Preferred location of actuator(s);
External loads (external aerodynamic loads);
Choice of materials (if any);
Lower and upper bounds on dimensions of beams (depending on the choice of manufacturing method); and
Preferred actuator type (including maximum force, and displacement)

At function block 473, the following determinations are made:

Create a network of beam elements to fit within the available space with certain nominal cross sectional dimensions;
Design Variable—Beam cross-section; and
Define boundary conditions—that is, identify nodes that should remain fixed to the ground, nodes where the actuator exerts input force and nodes on the boundary representing the outer surface of the shape to be morphed.

The figure shows function blocks 471 and 473 to direct the process to function block 475. At function block 475, there is performed the Optimization Procedure Objective function, specifically:

Minimize the shape error (between the shape obtained and shape desired);
Minimize the actuator force required to cause desired shape change against external resistive load; and
Minimize the overall weight of the system Subject to various constraints such as Maximum allowable stress, buckling load, fatigue stress, minimum and maximum dimensions of the beam elements, etc.

The process of design optimization then flows from function block 475 to function block 477, wherein, when the optimization process converges, cross-sections of certain beams approach zero leaving on a sub-set of beam elements necessary to meet the design specifications. This establishes the topology, size arid geometry of the compliant mechanism.

Figure 18A:
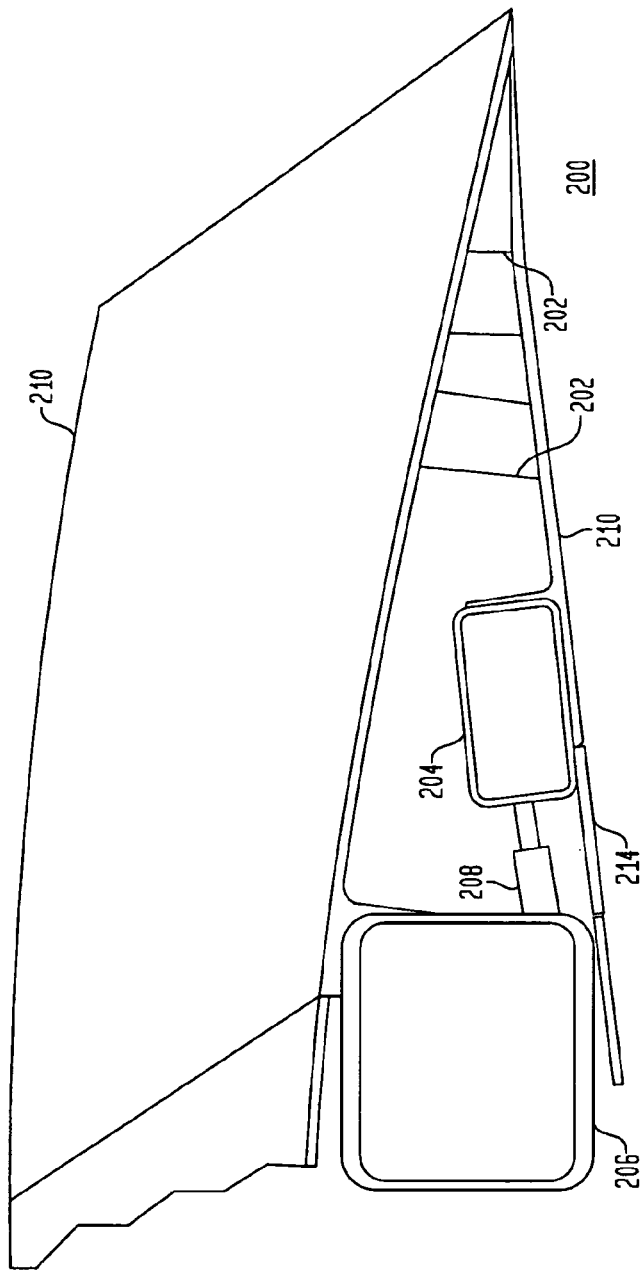
FIGS. 18(a), 18(b), and 18(c) are simplified schematic representations of a layered structure arrangement that is provided with web-like structures and is formed of a variable thickness core (FIG. 18(b)) or a composite laminate (FIG. 18(c))
Figure 18C:
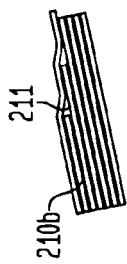
Figure 18B:
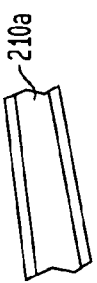

FIGS. 18(a), 18(b), and 18(c) are simplified schematic representations of a layered structure arrangement 200 that is provided with web-like structures 202 that are, in this specific illustrative embodiment of the invention, bonded to compliant skin 210, which will be described in greater detail in connection with FIGS. 18(b) and 18(c), below. Referring to FIG. 18(a), layered structure arrangement 200 is shown to be provided with a drive bar 204 that applies a linear force against rear wing spar 206 by operation of an actuator 208. The motion of drive bar 204 is transmitted to a compliant skin 210, the motion of the compliant skin being accommodated by a sliding joint 214 that in some embodiments of the invention may be configured as an elastomer panel (not shown).

FIG. 18(b) is a representation of compliant skin 210 that is formed, in this specific illustrative embodiment of the invention, of a variable thickness core 210(a). Alternatively, FIG. 18(c) shows compliant skin 210 to be a multiple-ply composite laminate 210(b) wherein the plies are staggered to facilitate control over thickness. As shown, the composite laminate plies are bonded to each other with a laminating adhesive 211. The composite layers are configured from the standpoint of ply orientation, fiber weave, selection of adhesive, etc. the achieve a desired compliant structure stiffness and strength.

Figure 19:
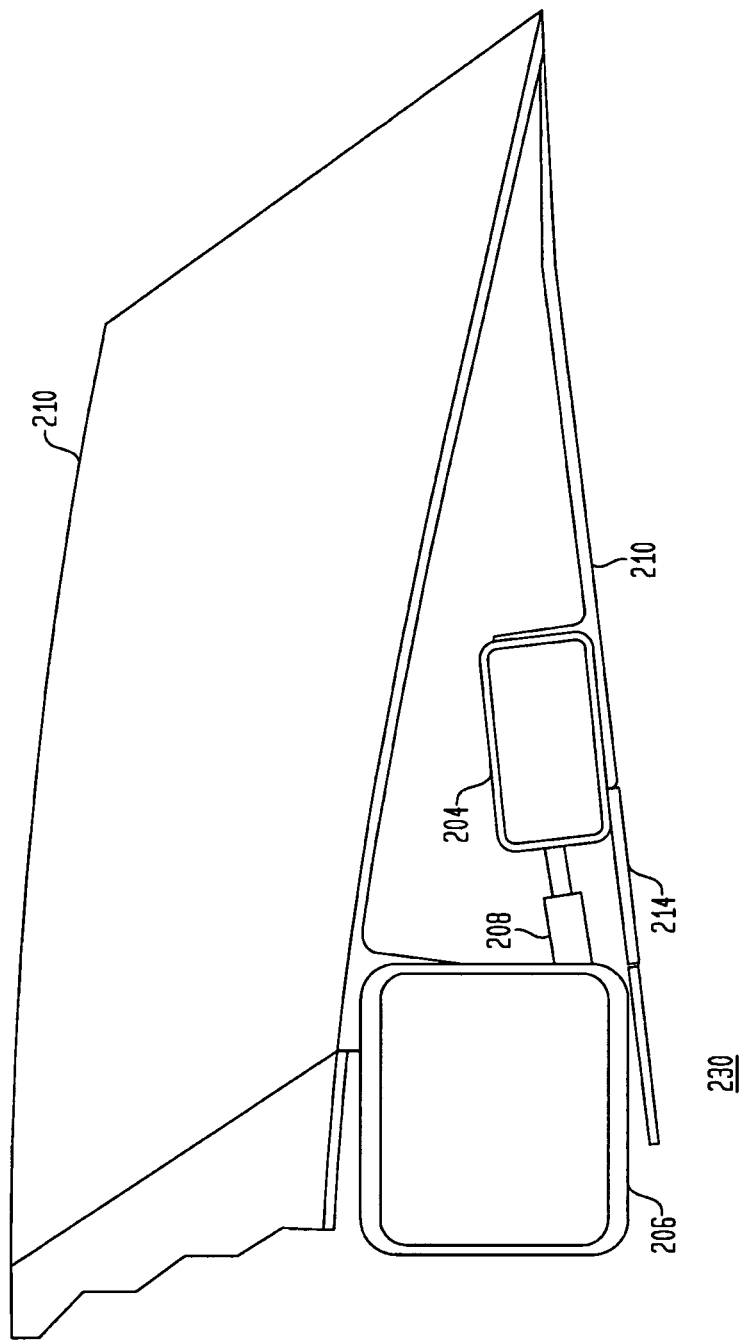
FIG. 19 is a simplified schematic representation of the layered structure arrangement without the web-like structures.

FIG. 19 is a simplified schematic representation of layered structure arrangement 230, without the web-like structures described in FIG. 18(a). Elements of structure that have previously been discussed are similarly designated in this figure.

Figure 20:
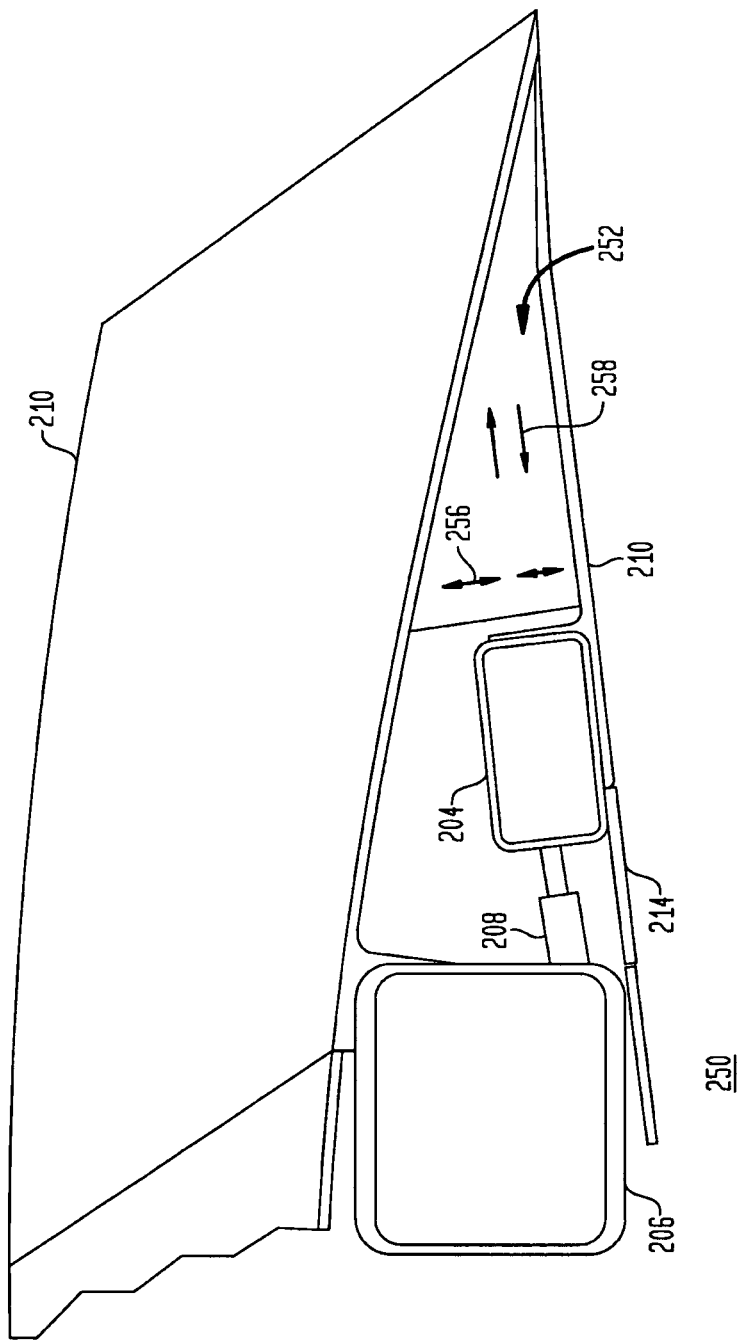
FIG. 20 is a simplified schematic representation of the layered structure arrangement with a tailored" core structure, illustratively formed of a cellular material.

FIG. 20 is a simplified schematic representation of the layered structure arrangement 250 with a tailored" core structure 252, illustratively formed of a cellular material. Core structure 252 is, in this specific illustrative embodiment of the invention, configured to have a high stiffness characteristic in the substantially vertical direction indicated by arrow 256, and a low stiffness characteristic in the substantially horizontal direction indicated by arrows 258.

Figure 21:
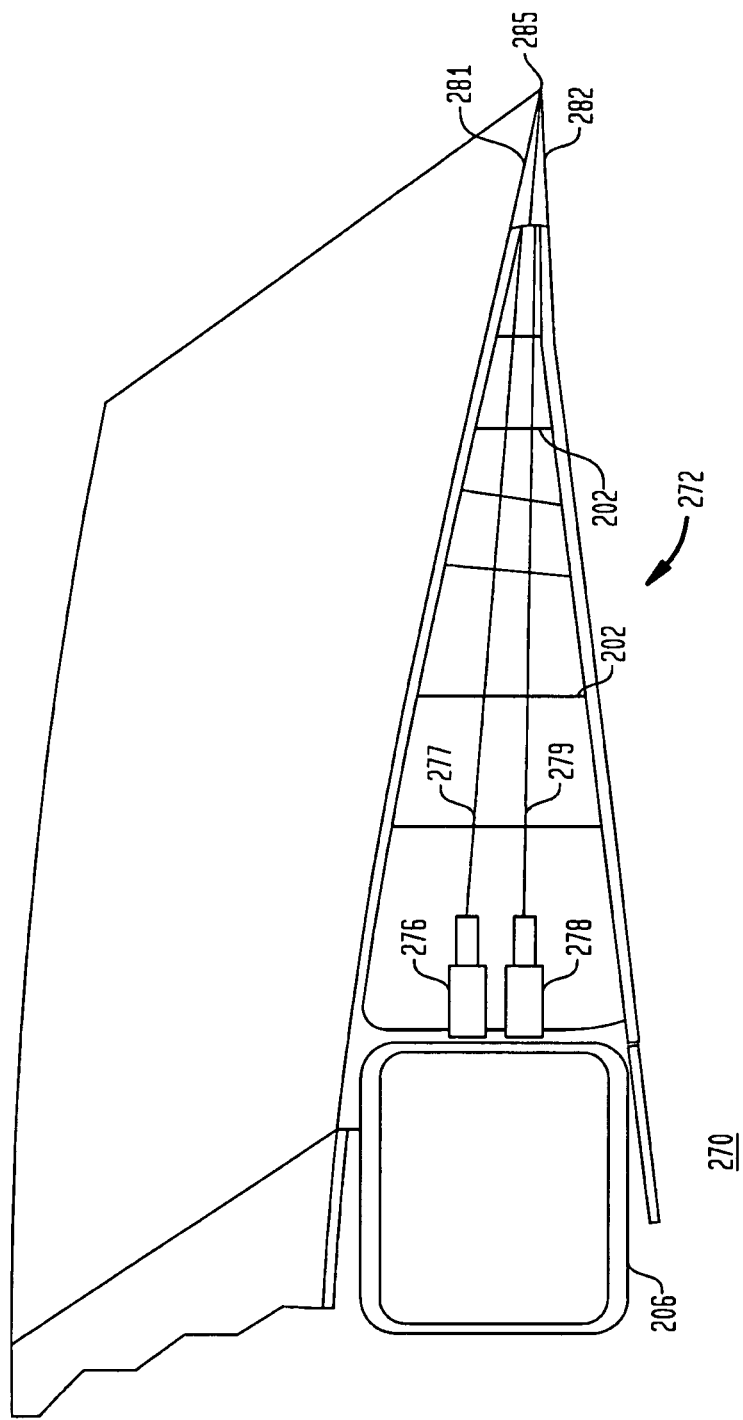
FIG. 21 is a simplified schematic representation of an arrangement having a split flap with a core that joins the top an bottom elements.

FIG. 21 is a simplified schematic representation of a fixed-fixed arrangement 270 wherein inward motion of lower surface 272 effects a change in the shape of the flap. In this embodiment, two actuators 276 and 278 are coupled by respectively associated ones of antagonistic drive cables 277 and 279, to respectively associated ones of trailing edge tip spars 281 and 282. In some embodiments, drive cables 277 and 279 may be replaced with rods (not shown). Tip spars 281 and 282 are configured to slip against each other at sliding joint 285.

Figure 22:
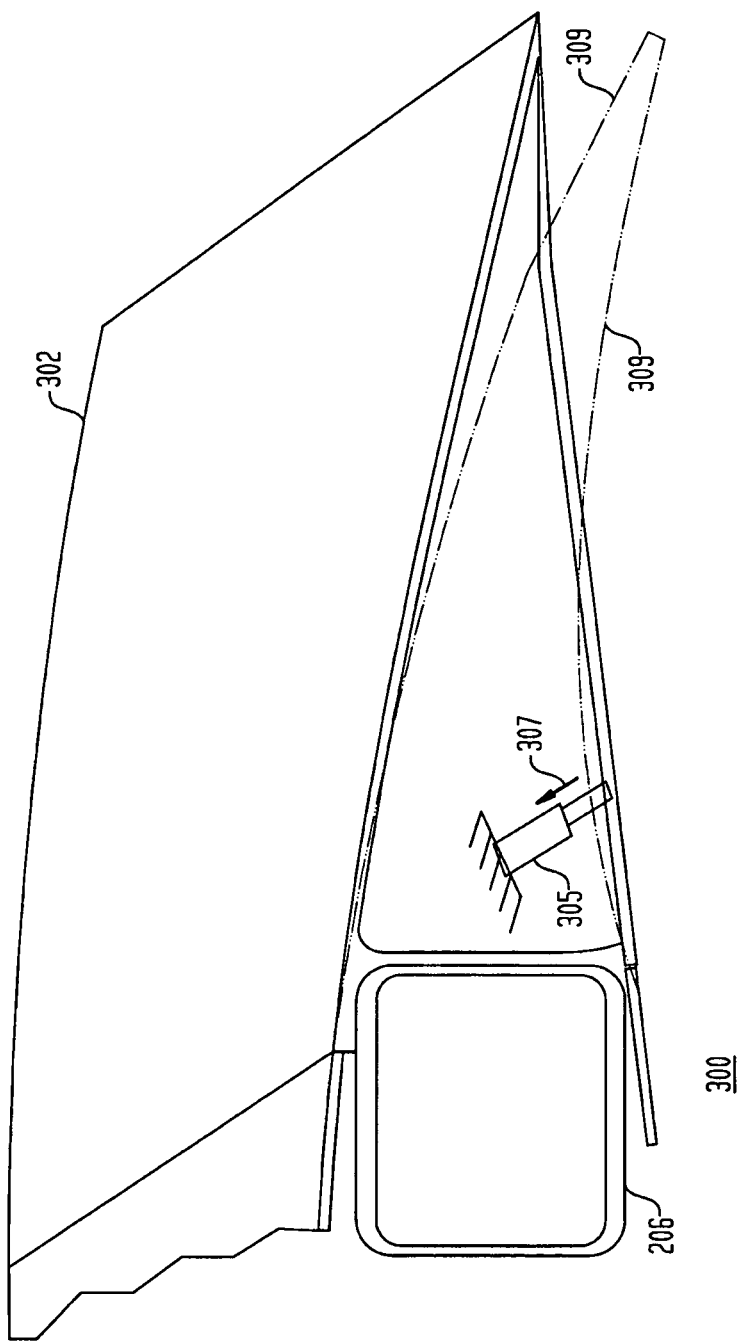
FIG. 22 is a simplified schematic representation of a fixed-fixed arrangement wherein inward motion of the lower surface effects a change in the shape of the flap.

FIG. 22 is a simplified schematic representation of a standard airfoil 300 having a variable thickness surface perimeter 302 to permit "tailoring" of the perimeter stiffness to achieve a best match for a desired contour. When actuator 305 is operated toward inward motion as indicated by the direction of arrow 307, the contour of variable thickness surface perimeter 302 is urged into the configuration represented in phantom and designated as 309. In this embodiment, there is no sliding joint or elastomer surface on either the top or bottom surface, thus it is termed a "fixed-fixed" configuration.

Figure 23:
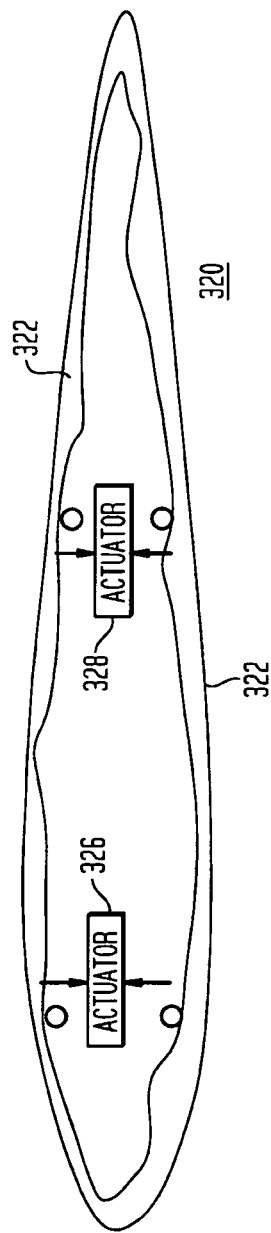
FIG. 23 is a simplified schematic representation of a standard airfoil having a variable thickness surface perimeter to permit "tailoring" of the perimeter stiffness to achieve a best match for a desired contour.

FIG. 23 is a simplified schematic representation of a standard airfoil 320 having a variable thickness surface perimeter 322 that permits "tailoring" of the perimeter stiffness to achieve a best match for a desired contour. That is, the varying wing thickness allows the perimeter stiffness to be "tailored" to facilitate the design of an advantageous contour characteristic. Thinning of the airfoil is effected by causing actuators 326 and 328 to pull inward in the direction of the arrows.

Figure 24:
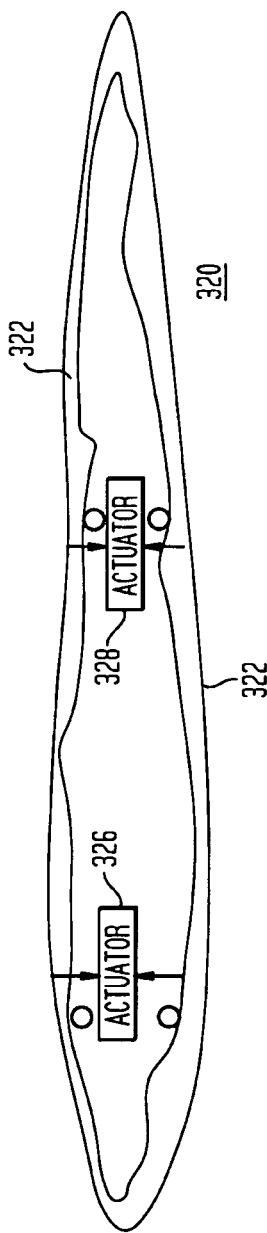
FIG. 24 is a simplified schematic representation of a thinned airfoil having a variable thickness surface perimeter to permit "tailoring" of the perimeter stiffness to achieve a best match for a desired contour.

FIG. 24 is a simplified schematic representation of airfoil 320 that has been "thinned" by operation of the actuators, as discussed hereinabove in relation to FIG. 23.

FIG. 25 is a simplified schematic representation of a standard airfoil 320 wherein the actuators 326 and 328 urge a thickening of the airfoil, in the direction of the arrows.

FIG. 26 is a simplified schematic representation of the standard airfoil of FIG. 25, showing the airfoil in thickened condition.

Figure 27:
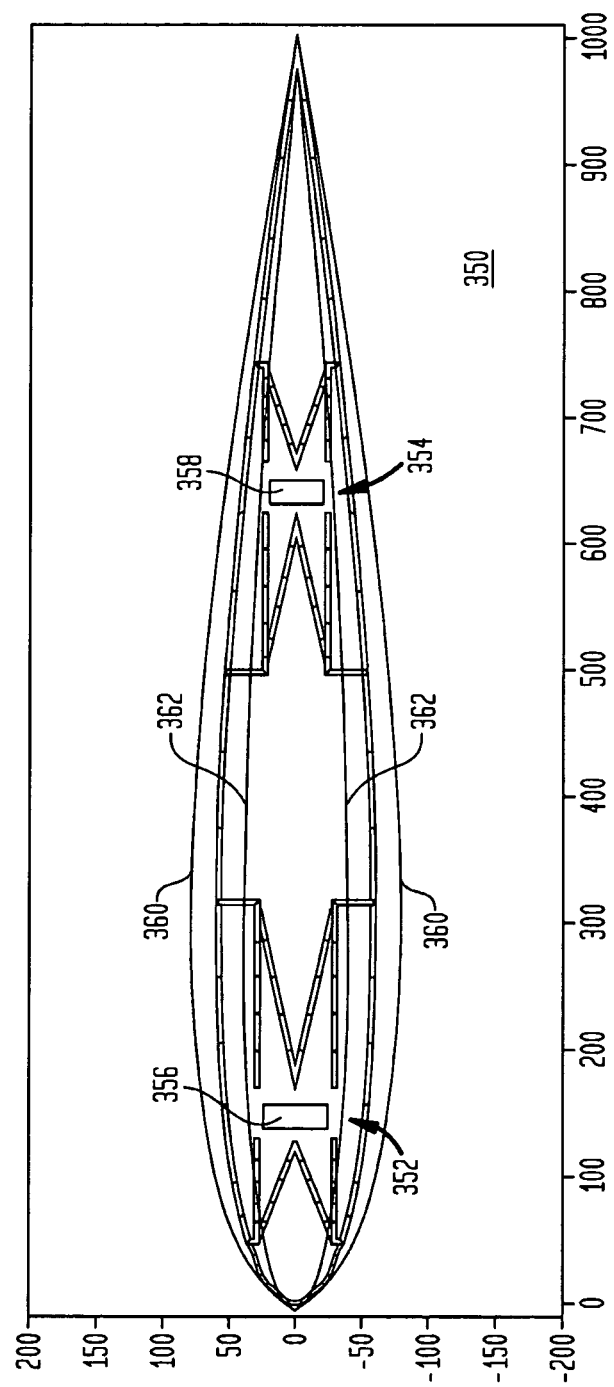
FIG. 27 is a ssr of a variable thickness airfoil that is actuated by a compliant mechanism.

FIG. 27 is a simplified schematic representation of a variable thickness airfoil 350 that is actuated, in this specific illustrative embodiment of the invention, by compliant mechanisms 352 and 354. By operation of actuators 356 and 358, the airfoil is either thickened, as represented by contour 360, or thinned, as represented by contour 362.

Although the invention has been described in terms of specific embodiments and applications, persons skilled in the art may, in light of this teaching, generate additional embodiments without exceeding the scope or departing from the spirit of the invention described and claimed herein. Accordingly, it is to be understood that the drawing and description in this disclosure are proffered to facilitate comprehension of the invention, and should not be construed to limit the scope thereof.

What is claimed is:

1. An edge morphing arrangement for an elongated airfoil having upper and lower control surfaces, the elongated airfoil edge morphing arrangement comprising:
    an elongated edge portion arranged to overlie the curved leading edge of the elongated airfoil, said elongated edge portion having a substantially continuous surface element having a first and second surface element edges that are arranged to communicate with, and to form extensions of, respectively associated ones of the upper and lower control surfaces of the elongated airfoil, the substantially continuous surface element being formed of a deformable compliant material that extends cross-sectionally from the first surface element edge that is configured to communicate with, and form an extension of, one of the upper and lower control surfaces, to an apex of said edge portion, and to the second surface element edge that is configured to communicate with, and form an extension of the other of the upper and lower control surface; and
    an actuation linkage element coupled to an interior surface of the substantially continuous surface element.

2. The edge morphing arrangement of claim 1, wherein there is further provided a linkage element formed of a compliant material and having first and second ends, the first and second ends each being coupled to respective portions of the interior surface of the substantially continuous surface element of said edge portion.

3. The edge morphing arrangement of claim 2, wherein the respective portions of the interior surface of the substantially continuous surface element are arranged to have the apex of said edge portion therebetween.

4. The edge morphing arrangement of claim 1, wherein there is further provided:
    a linear actuator having a longitudinal axis and a first coupler element angularly arranged at an angle with respect to the longitudinal axis; and
    a rotatory element having an axis of rotation and a second coupler element for engaging with actuation linkage element.

5. The edge morphing arrangement of claim 4, wherein:
    the first coupler element of said linear actuator comprises a slot arranged in relation to the longitudinal axis; and
    the second coupler element of said rotatory element comprises an engagement pin for engaging with the slot of the first coupler element.

6. The edge morphing arrangement of claim 5, wherein there is further provided a bearing arrangement for coupling the engagement pin rotatively to said rotatory element.

7. The edge morphing arrangement of claim 1, wherein the first surface element edge is fixedly coupled to the upper control surface, and the second surface element edge is slidably coupled to the lower control surface.

8. The edge morphing arrangement of claim 7, wherein there is further provided a rotatory drive element coupled to the second end of said driving link for delivering a morphing force.

9. The edge morphing arrangement of claim 8, wherein there is further provided a longitudinal drive element engaged with said rotatory drive element for urging said rotatory drive element to deliver the morphing force.

10. The edge morphing arrangement of claim 1, wherein the substantially continuous surface element has a thickness that varies over the substantially continuous surface.

11. The edge morphing arrangement of claim 1, wherein the substantially continuous surface element has a thickness that is uniform over the substantially continuous surface.

12. The edge morphing arrangement of claim 1, wherein the substantially continuous surface element is constructed of a composite laminate material.

13. The edge morphing arrangement of claim 12, wherein the composite laminate material is a fiber glass composite GFRP.

14. The edge morphing arrangement of claim 1, wherein there is further provided a driving link having first and second driving link ends, the first driving link end being coupled to the second end of said actuation linkage element.

15. The edge morphing arrangement of claim 14, wherein there is further provided:
   a further linkage element formed of a compliant material and having a first and second ends, the first and second ends each being coupled to respectively portions the interior surface of the substantially continuous surface element.

* * * * *